US012734912B2

(12) United States Patent
Miler et al.

(10) Patent No.: US 12,734,912 B2
(45) Date of Patent: Sep. 15, 2026

(54) LOW PROFILE ELECTRIC CONNECTOR FOR A VEHICLE CHARGING SYSTEM

(71) Applicant: Jaro Fleet Technologies, Inc., Oakland, CA (US)

(72) Inventors: Josef Miler, Oakland, CA (US); Stuart Sonatina, El Cerrito, CA (US)

(73) Assignee: Jaro Fleet Technologies, Inc., Oakland, CA (US)

( * ) Notice: Subject to any disclaimer, the term of this patent is extended or adjusted under 35 U.S.C. 154(b) by 615 days.

(21) Appl. No.: 18/217,269

(22) Filed: Jun. 30, 2023

(65) Prior Publication Data

US 2024/0109440 A1 Apr. 4, 2024

Related U.S. Application Data

(60) Provisional application No. 63/391,480, filed on Jul. 22, 2022, provisional application No. 63/358,082, filed on Jul. 1, 2022.

(51) Int. Cl.
*B60L 53/16* (2019.01)
*B60L 53/35* (2019.01)
*B60L 53/66* (2019.01)

(52) U.S. Cl.
CPC ............... *B60L 53/16* (2019.02); *B60L 53/35* (2019.02); *B60L 53/66* (2019.02); *B60L 2200/36* (2013.01)

(58) Field of Classification Search
CPC .......... B60L 53/16; B60L 53/35; B60L 53/66; B60L 2200/36
See application file for complete search history.

(56) References Cited

U.S. PATENT DOCUMENTS

| | | | |
|---|---|---|---|
| 5,272,431 | A | 12/1993 | Nee |
| 5,821,731 | A | 10/1998 | Kuki et al. |
| 10,272,790 | B2 | 4/2019 | Bell et al. |
| 10,518,658 | B1 | 12/2019 | Eakins et al. |
| 10,821,847 | B2 | 11/2020 | Eakins et al. |

(Continued)

FOREIGN PATENT DOCUMENTS

| | | | |
|---|---|---|---|
| DE | 102009001080 | A1 | 8/2010 |
| EP | 3552863 | A1 | 10/2019 |

(Continued)

OTHER PUBLICATIONS

Adventures in Fuel Economy, Energy Use, Physics, and Life: Charging the Tesla class 8 semi (Dec. 27, 2017), online], [retrieved on Jun. 18, 2020], Retrieved from the Internet:.

(Continued)

*Primary Examiner* — Robert J McCarry, Jr.
(74) *Attorney, Agent, or Firm* — Weber Rosselli & Cannon LLP

(57) ABSTRACT

An electric vehicle charging system includes an electrical connector configured for emitting or receiving electricity from the electric vehicle charging station. The electrical connector includes a base and an array of coaxial electrical contact. The base has a height, a width and a length, with the height being less than the width and the length. A center axis of the electrical connector extends in a direction of the height, and each of the contacts is being mounted on the base to be radially elastic with respect to the center axis to radially press against a further electrical connector mated therewith.

19 Claims, 33 Drawing Sheets

(56) References Cited

U.S. PATENT DOCUMENTS

| | | | |
|---|---|---|---|
| 10,843,584 B2 | 11/2020 | Cole et al. | |
| 11,034,250 B2 | 6/2021 | Zethraeus et al. | |
| 11,279,253 B2 * | 3/2022 | Flechl | B60L 53/30 |
| 2003/0075235 A1 | 4/2003 | Graham et al. | |
| 2011/0066515 A1 | 3/2011 | Horvath et al. | |
| 2011/0114398 A1 | 5/2011 | Bianco | |
| 2013/0193918 A1 | 8/2013 | Sarkar et al. | |
| 2014/0070767 A1 | 3/2014 | Morris et al. | |
| 2014/0333261 A1 | 11/2014 | Oh et al. | |
| 2016/0167532 A1 | 6/2016 | Weigel et al. | |
| 2016/0332525 A1 | 11/2016 | Kufner et al. | |
| 2017/0096073 A1 | 4/2017 | Mardall et al. | |
| 2021/0122259 A1 | 4/2021 | Dobie et al. | |

FOREIGN PATENT DOCUMENTS

| | | |
|---|---|---|
| EP | 3835113 A1 | 10/2019 |
| WO | 2016096194 A1 | 6/2016 |

OTHER PUBLICATIONS

Akerman, Patrik et al., "Demonsliating a System for Efficient and Sustainable Road Freight Based on Dynamic PowerSupply", Proceedings of 6th Transport Research Arena, Apr. 18-21, 2016, Warsaw, Poland, p. 10.

Chargepoint, Inc., How Do Level 2 and DC Fast Fit in the Electric Vehicle Charging Landscape? (2017), p. 8.

Choe, Brian, Zero Emission Heavy Duty Drayage Truck Demonslialion, South Coast Air Quality Management District [May 16, 2013), p. 17.

Domingues-Olavarria, Gabriel et al., Electric Roads: Analyzing the Societal Cost of Electrifying All Danish Road Transport, World Electric Vehicle Journal. 2018, vol. 9, No. 9 (Jun. 7, 2018), p. 11; doi: 10.3390/9010009.

Jeong, Seungmin et al., Economic Analysis of the Dynamic Charging Electric Vehicle, IEEE Transactions On Power FI FCTRONICS Nov. 2015) vol. 30, No. 11, pp. 6368-6377.

Miller, John M et al., High-Power Wireless Charging Of Heavy Duty EVs: Techniques, Challenges And Limitations, How2Power Today (Dec. 2017), p. 21.

Moultak, Marissa et al., Transitioning to zero-emission heavy-duty freight vehicles, International Council on Clean Transportation (Sep. 26, 2017), p. 3.

National Academies of Sciences, Engineering, and Medicine 2017. Guide to Deploying Clean Truck Freight Strategies. Washington, DC: The National Academies Press. (2017), pp. 16-17.

Oakleaf, Brett, Smart Ports. Technology Advancements in Intermodal Transportation (Mar. 7, 2018), National Renewable Energy Laboratory, p. 27.

Overhead Catenary System Demonslialion Concept Overview, WCC Goods Movement Webinar (Jun. 2, 2015), p. 21.

* cited by examiner

Length
800
805
804
804
808
808
808
802
806
Width
800 804
804
804
Conductors
802
Fingerstock
Width and length
Cross section
Top connector (green)
805
809
Fingerstock
Height
Bottom connector
(beige)
808
808
808
812
810
814
802
804
800
CA FIG. 18A
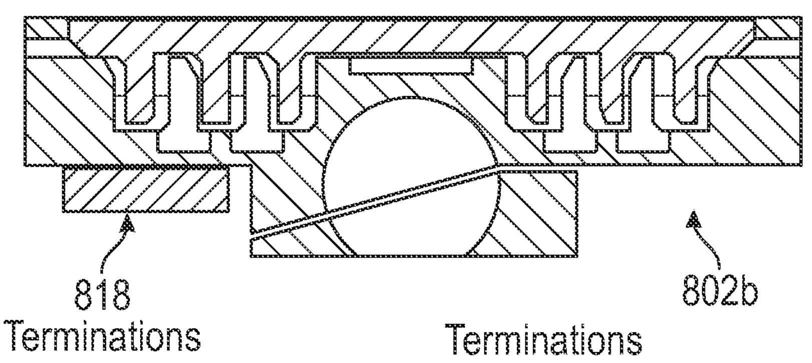
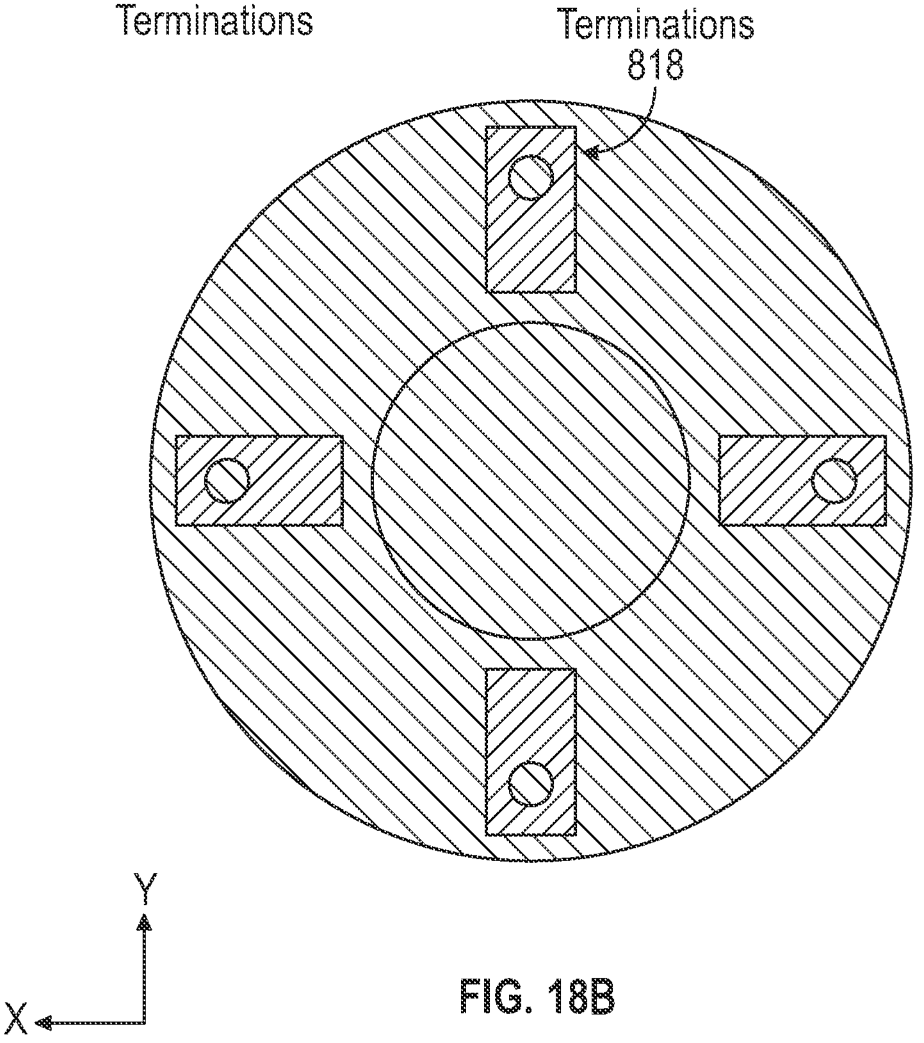
FIG. 18B FIG. 21A
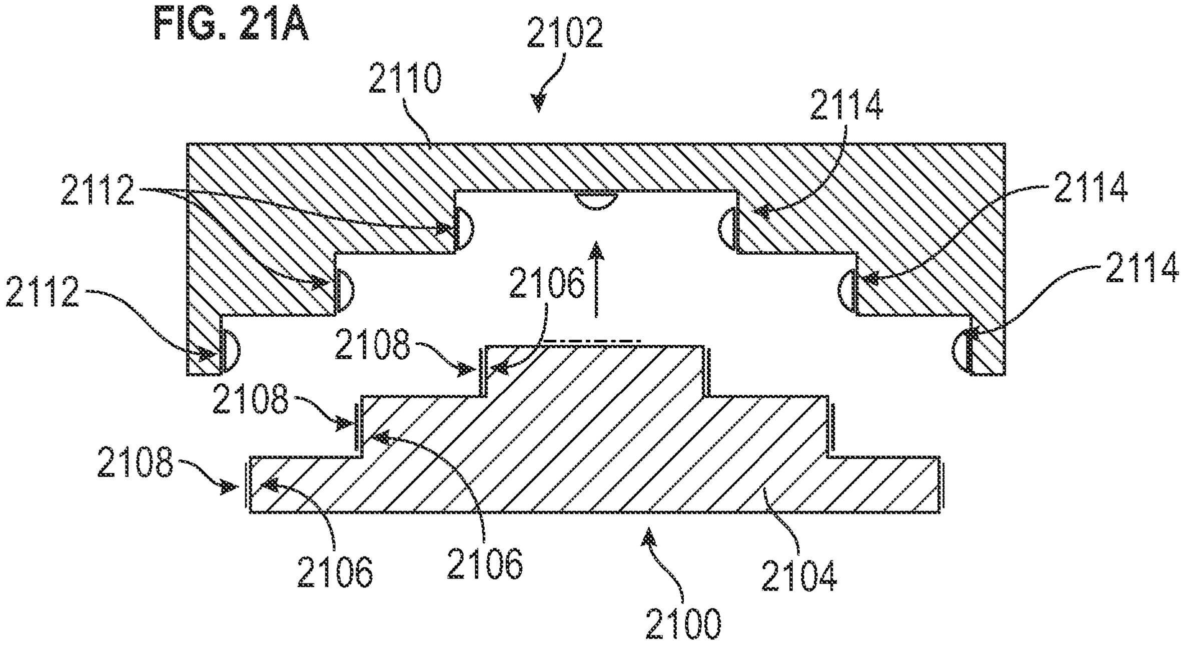
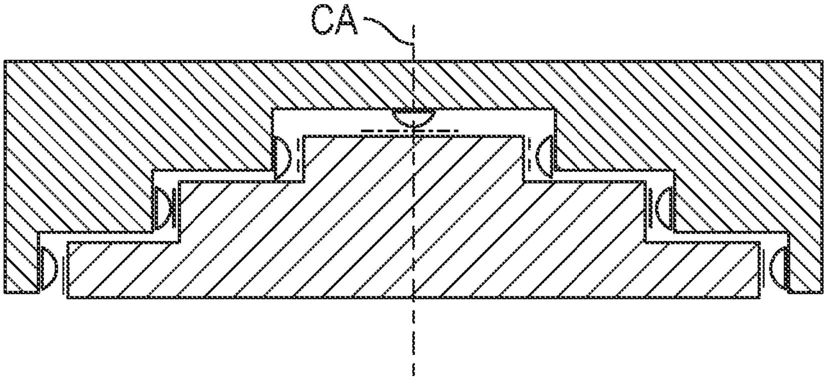
FIG. 21B FIG. 30A
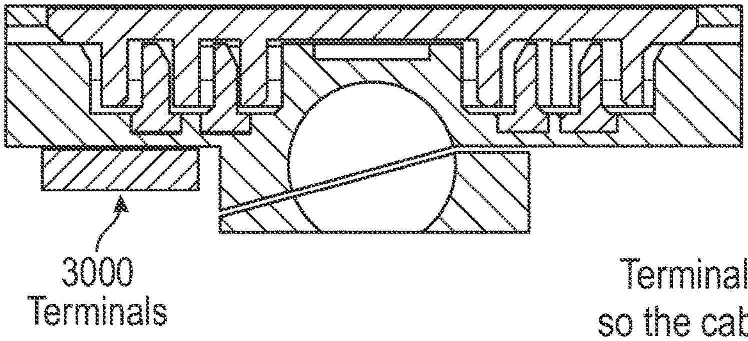
Terminals are "clumped" so the cables leading away from the connector are easily routed together.
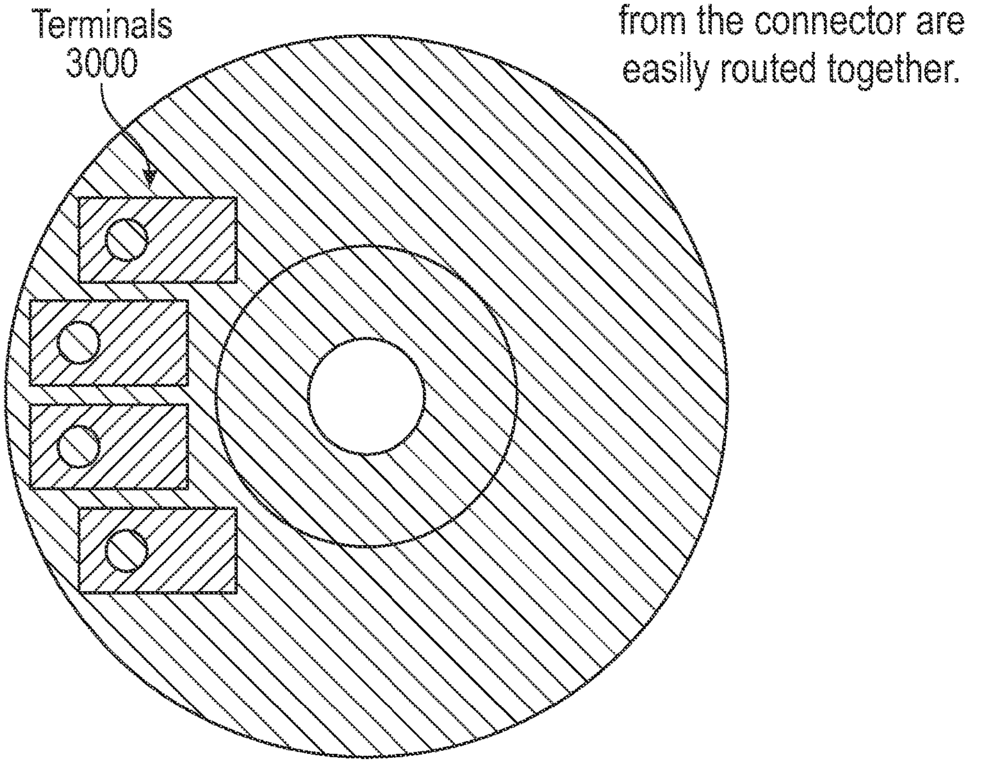
FIG. 30B

LOW PROFILE ELECTRIC CONNECTOR FOR A VEHICLE CHARGING SYSTEM

The present disclosure relates generally to electric vehicle recharging systems, and specifically a low profile electrical connector for a vehicle recharging system.

BACKGROUND

Electrical connectors of electric vehicle charging systems often have a high profile, need to be oriented and are not equipped for charging heavy duty vehicles such as semi-trucks.

SUMMARY

In some aspects, the techniques described herein relate to an electric vehicle charging system including: an electrical connector configured for emitting or receiving electricity from the electric vehicle charging station, the electrical connector including a base and an array of coaxial electrical contacts, the base having a height, a width and a length, the height being less than the width and the length, a center axis of the electrical connector extending in a direction of the height, each of the contacts being mounted on the base to be radially elastic with respect to the center axis to radially press against a further electrical connector mated therewith.

In some aspects, the techniques described herein relate to an electric vehicle charging system wherein each of the coaxial electrical contacts includes a plurality of radially elastic tabs.

In some aspects, the techniques described herein relate to an electric vehicle charging system wherein the plurality of radially elastic tabs of each of the coaxial electrical contacts are arranged in a circle.

In some aspects, the techniques described herein relate to an electric vehicle charging system wherein each of the coaxial electrical contacts is formed of electrically conductive finger stock.

In some aspects, the techniques described herein relate to an electric vehicle charging system wherein the base includes a plurality of coaxial annular grooves, each of the coaxial electrical contacts being in one of the grooves.

In some aspects, the techniques described herein relate to an electric vehicle charging system wherein each of the plurality of coaxial annular grooves includes a radially extending disc-shaped surface and two axially extending cylindrical surfaces extending away from the radially extending disc-shaped surface, each of the coaxial electrical contacts being on one of the axially extending cylindrical surfaces.

In some aspects, the techniques described herein relate to an electric vehicle charging system wherein each of the coaxial electrical contacts is on the axially extending cylindrical surface defining an inner circumferential surface of the respective annular groove.

In some aspects, the techniques described herein relate to an electric vehicle charging system wherein each of the coaxial electrical contacts is on the axially extending cylindrical surface defining an outer circumferential surface of the respective annular groove.

In some aspects, the techniques described herein relate to an electric vehicle charging system further including a plurality of drain holes, the coaxial electrical contacts being on a first axially facing side of the base, the drain holes each extending from one of the coaxial annular grooves to a second axially facing side of the base opposite the first axially facing side.

In some aspects, the techniques described herein relate to an electric vehicle charging system wherein the coaxial electrical contacts are on a first axially facing side of the base, the electrical connector further including a plurality of terminations on a second axially facing side of the base opposite the first axially facing side, the terminations each being electrically connected to one of the coaxial electrical contacts and configured for connecting to a respective electrical cable.

In some aspects, the techniques described herein relate to an electric vehicle charging system wherein the electrical connector includes a data contact on the base radially inside of the coaxial electrical contacts.

In some aspects, the techniques described herein relate to an electric vehicle charging system wherein the data contact is concentric with the coaxial electrical contacts.

In some aspects, the techniques described herein relate to an electric vehicle charging system wherein the data contact is on the base at the center of the coaxial electrical contacts.

In some aspects, the techniques described herein relate to an electric vehicle charging system including: a first electrical connector; and a second electrical connector configured for mating with the first electrical connector for emitting electricity from one of the first or second electrical connector to the other of the first or second electrical connector, the first electrical connector including a first base and an array of first coaxial electrical contacts, the first base having a height, a width and a length, the height being less than the width and the length, a center axis of the first electrical connector extending in a direction of the height, the first base including a plurality of first coaxial annular grooves, each of the first coaxial annular grooves including an axially extending surface, one of the first electrical contacts being in each of the grooves, each of the first electrical contact extending radially away from the respective axially extending surface.

In some aspects, the techniques described herein relate to an electric vehicle charging system wherein each of the first electrical contacts is mounted on the base to be radially elastic with respect to the center axis to radially press against second electrical contacts of the second electrical connector when the first electrical connector is mated with the second electrical connector.

In some aspects, the techniques described herein relate to an electric vehicle charging system wherein the second electrical connector includes a second base including a plurality of coaxial rings, each of the coaxial rings including one of the second electrical contacts on an axially extending surface thereof, each of the coaxial rings being received in a respective one of the coaxial annular grooves such that the first electrical contacts radially press against one of the second electrical contacts when the first electrical connector is mated with the second electrical connector.

In some aspects, the techniques described herein relate to an electric vehicle charging system including: a first electrical connector configured for emitting or receiving electricity from an electric vehicle charging system, the first electrical connector including a first base including a surface and first ring-shaped electrical contacts on the surface, the first base having a height, a width and a length, the height being less than the width and the length, a vertical axis of the first electrical connector extending in a direction of the height and passing through the surface, the first electrical contacts being on the surface; a second electrical connector configured for emitting or receiving electricity from an electric vehicle charging station, the second electrical connector including a second base and an array of second electrical contacts on the second base, the first electrical contacts contacting the second electrical contacts when the first electrical connector is received inside of the second electrical connector.

In some aspects, the techniques described herein relate to an electric vehicle charging system as recited, wherein the first base and the second base are each disc-shaped.

In some aspects, the techniques described herein relate to an electric vehicle charging system including: a charging arm; an electrical connector mounted on the charging arm and configured for emitting electricity from the electric vehicle charging station; and an actuator configured for moving the electrical connector into engagement with an electric receptacle on an electric vehicle, the electrical connector including a base including a surface and electrical contacts on the surface, the base having a height, a width and a length, the height being less than the width and the length, a vertical axis of the electrical connector extending in a direction of the height and passing through the surface, the electrical contacts being on the surface.

In some aspects, the techniques described herein relate to an electric vehicle charging system wherein the electrical contacts are formed by a plurality of strips running parallel to each other.

In some aspects, the techniques described herein relate to an electric vehicle charging system further including a receiver for horizontally receiving the electrical connector.

In some aspects, the techniques described herein relate to an electric vehicle charging system wherein the receiver includes an upper wall and a lower wall defining a horizontally facing opening.

In some aspects, the techniques described herein relate to an electric vehicle charging system wherein the surface of the base in which the electrical contacts are on is an upper surface and the base includes a lower surface including electrical contacts, each of the upper wall and the lower wall including electrical contacts, the electrical contacts of the receiver contacting the electrical contacts of the electrical connector when the electrical connecter is mating inside of the receiver.

In some aspects, the techniques described herein relate to a method 21; and moving the charging arm via the actuator to horizontally insert the electrical connector into the receiver.

In some aspects, the techniques described herein relate to an electric vehicle charging arm including: an electrical connector configured for emitting electricity from an electric vehicle charging station, the electrical connector including a base and an array of coaxial electrical contacts, each of the contacts having a height, a width and a length, the height being less than the width and the length, a center axis of the electrical connector extending in a direction of the height, each of the contacts being mounted on the base to be radially elastic with respect to the center axis to radially press against a further electrical connector mated therewith.

In some aspects, the techniques described herein relate to an electric vehicle charging receiver including: an electrical connector configured for receiving electricity from an electric vehicle charging station, the electrical connector including a base and an array of coaxial electrical contacts, each of the contacts having a height, a width and a length, the height being less than the width and the length, a center axis of the electrical connector extending in a direction of the height, each of the contacts being mounted on the base to be radially elastic with respect to the center axis to radially press against a further electrical connector mated therewith.

In some aspects, the techniques described herein relate to an electric vehicle charging arm including: an electrical connector configured for emitting electricity, the electrical connector including a base and electrical contacts, each of the contacts having a height, a width and a length, the height being less than the width and the length, a center axis of the electrical connector extending in a direction of the height, each of the contacts being mounted on the base; and a joint, the electrical connector, the electrical connector being mounted on the joint for pivoting in three dimensions and providing a passive correction of up to +/−200 angular misalignment.

In some aspects, the techniques described herein relate to an electric vehicle charging arm wherein the joint is a ball joint.

In some aspects, the techniques described herein relate to an electric vehicle charging system including: a first electrical connector configured for emitting or receiving electricity from an electric vehicle charging station, the first electrical connector including a disc shaped base including an outer circumferential surface and an array of second electrical contacts on the outer circumferential surface; a second electrical connector configured for emitting or receiving electricity from the electric vehicle charging station, the second electrical connector including a disc shaped base having a circular opening and including an inner circumferential surface, the second electrical connector further including an array of first electrical contacts on the inner circumferential surface, the first electrical contacts contacting the second electrical contacts when the first electrical connector is received inside of the second electrical connector.

In some aspects, the techniques described herein relate to an electric vehicle charging system including: a first electrical connector configured for emitting or receiving electricity from an electric vehicle charging station, the first electrical connector including a first base having an outer circumferential surface defined by a plurality of first concentric circles that are each shifted axially away from each other, the first electrical connector including a plurality of first electrical contacts, each of the first electrical contacts being on one of the concentric circles; and a second electrical connector configured for emitting or receiving electricity from the electric vehicle charging station, the second electrical connector including a second base having an inner circumferential surface defined by a plurality of second concentric circles that are each shifted axially away from each other, the inner circumferential surface forming a receptacle, the second electrical connector further including a plurality of second electrical contacts on the inner circumferential surface, the first electrical contacts contacting the second electrical contacts when the first electrical connector is received inside of the second electrical connector.

In some aspects, the techniques described herein relate to an electric vehicle charging system wherein each of the first electric contacts is mounted on the first base to be radially elastic with respect to a center axis of the first base to radially press against the second electrical contacts when the first electrical connector is received inside of the second electrical connector.

In some aspects, the techniques described herein relate to an electric vehicle charging system wherein each of the second electric contacts is mounted on the second base to be radially elastic with respect to a center axis of the second base to radially press against the first electrical contacts when the first electrical connector is received inside of the second electrical connector.

In some aspects, the techniques described herein relate to an electric vehicle charging system including: a first electrical connector configured for emitting or receiving electricity from an electric vehicle charging station, the first electrical connector including a first base having an annular rim, the first electrical connector including a plurality of first electrical contacts, the first electrical contacts being on an inner circumferential surface of the rim, an outer circumferential surface of the rim and an axially facing radially extending edge of the rim; and a second electrical connector configured for emitting or receiving electricity from the electric vehicle charging station, the second electrical connector including a second base including an annular groove formed therein, the second electrical connector including a plurality of second electrical contacts, the second electrical contacts being on an inner circumferential surface of the annular groove, an outer circumferential surface of the annular groove and an axially facing radially extending surface of the annular groove, the first electrical contacts contacting the second electrical contacts when the first electrical connector is received inside of the second electrical connector.

BRIEF DESCRIPTION OF THE DRAWINGS

The present invention is described below by reference to the following drawings, in which:

FIGS. 18A and 18B shows a base of the electrical connector can include a plurality of terminations on the second axially facing side of the base;

FIGS. 21A and 21B schematically show an exemplary connector configured for mating with each other to charge an electric vehicle battery;

FIGS. 30A and 30B show a further example of the base of the electrical connector including a plurality of terminations on the second axially facing side of the base.

DETAILED DESCRIPTION

Figure 1:
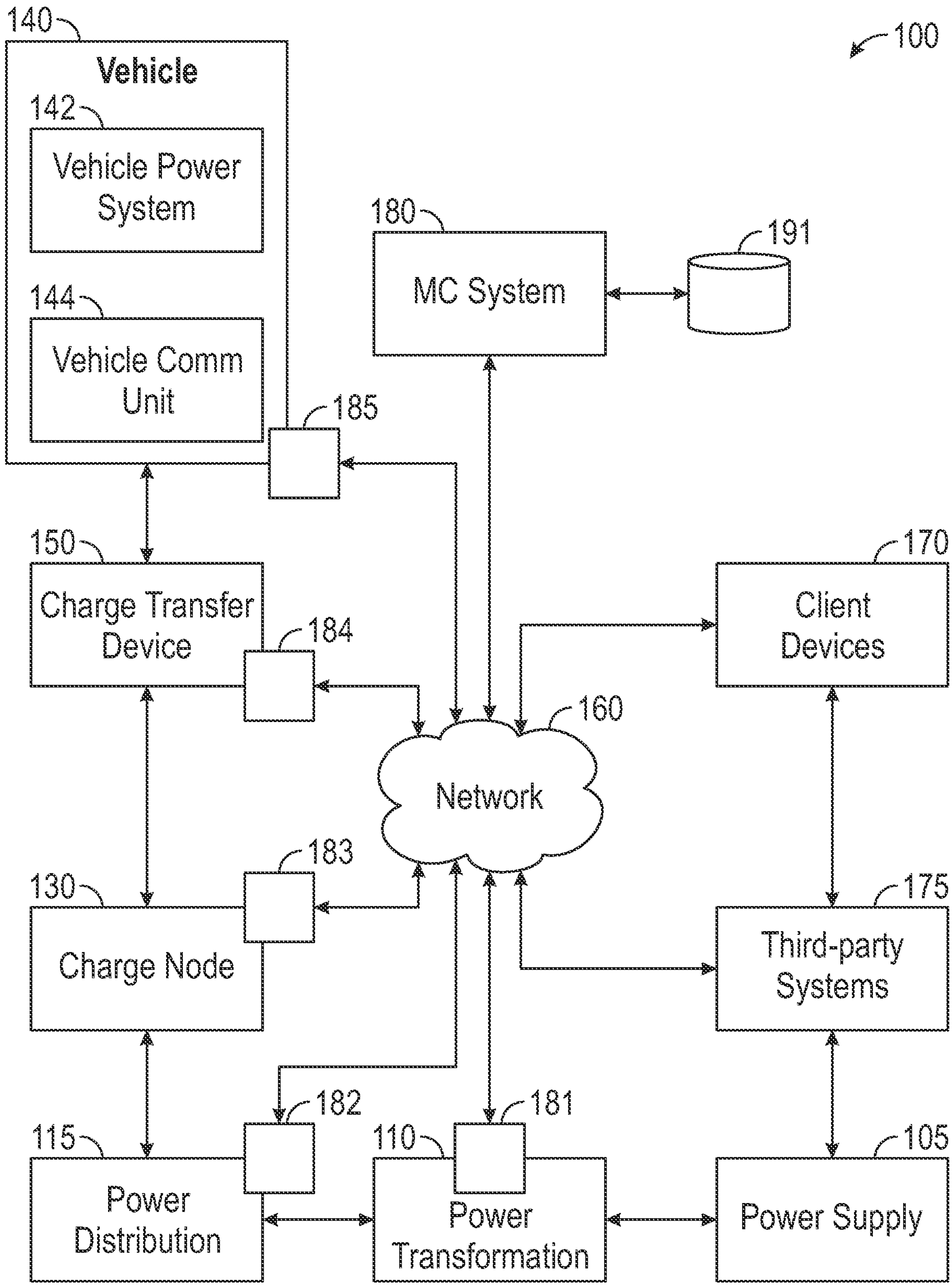
FIG. 1 schematically shows an exemplary electric vehicle charging system according to an embodiment of the present disclosure.

FIG. 1 schematically shows an exemplary electric vehicle charging system 100 according to an embodiment of the present disclosure. As shown, the system 100 may comprise a power transformation module 110, a power distribution module 115, one or more charging stations in the form of charge nodes 130, one or more charge transfer devices 150, and a monitoring and control ("MC") system 180.

In one embodiment, the charging system 100 may comprise a power transformation module 110 in electrical communication with a power supply 105, such as a local utility grid transformer. The power transformation module 110 is generally adapted to receive an electrical output from the power supply 105 and transform the same into an electrical flow that may be distributed to the various downstream system components (e.g., charge nodes 130 and/or charge transfer devices 150) via the power distribution module 115.

The power transformation module 110 may comprise one or more AC/DC transformers, step-down transformers, and/or inverters having appropriate power electronics components to safely, efficiently, and reliably transform the power received from the power supply 105 to the appropriate current and voltage for distribution via the power distribution module 115. It will be appreciated that the appropriate current and voltage may be determined based on characteristics and/or requirements of the power distribution module 115 (e.g., current-carrying capacity, thermal management capabilities, voltage isolation and arc prevention, ingress protection, and/or creepage-and-clearance protections), the charge nodes 130, the charge transfer devices 150 and/or requirements of any vehicles 140 in communication with the charging system 100. Nevertheless, in certain embodiments, the power transformation system may be adapted to output power at up to about 1,000 VDC and up to about 450 kW per vehicle, for up to 10 vehicles.

As shown, the power transformation module 110 may be in electrical communication with a power distribution module 115. Generally, the power distribution module 115 may comprise any number of power lines configured to transfer electrical power from the power transformation module to the charge nodes 130. The power lines may be embedded within a roadway or may extend on, or above, the ground surface. The power lines may be enclosed in a protective conduit. In any event, the power lines of the power distribution module 115 may be configured to transmit power at up to about 1,000 VDC and up to about 450 kW per vehicle, for up to 10 vehicles.

In other embodiments, power distribution module 115 may be configured to transmit power at up to 500 kW per vehicle via charging station 500 and connectors 510, 800. Assuming the vehicle consumes 2 kWh of energy per mile driven, a charger will need to deliver 200 kWh in order to extend the range of the vehicle by 100 miles. 200 kWh delivered in 30 minutes requires 400 kW of power. This is generally regarded as a conservative amount of energy required, so 500 kW is likely a more realistic power requirement to deliver 100 miles of range during a 30 minute charge.

As shown, the charge system further comprises any number of charge nodes 130 in electrical communication with the power distribution module 115. As explained in detail below, the charge nodes 130 are generally adapted to receive power from the power distribution module 115 in order to safely, efficiently, and reliably deliver such power to a charge transfer device 150 upon request.

Accordingly, the system may comprise any number of charge transfer devices 150, wherein each device is adapted to receive electrical power from one of the charge nodes 130 and to provide such power to the vehicle's power supply. In certain embodiments, each charge transfer device 150 may be physically attached to a vehicle 140, for example, at a bottom surface of a vehicle's chassis.

Each charge transfer device 150 may also be in electrical communication with the vehicle's 140 power system 142 via connection to a suitable location. It will be appreciated that such location may vary from one vehicle to another. On some vehicles, the connection may be made to the high-voltage distribution center. On other vehicles, the connection may be made to the high-voltage battery pack. On yet other vehicles, the connection may be made to the onboard charge port hardware. And on yet other vehicles, the connection may be made to a junction point in the vehicle high-voltage power lines.

As discussed below with respect to FIG. 3, the charge transfer device 150 may comprise a power conditioning module adapted to condition a high-voltage power input for transmittal to a vehicle power system. Additionally or alternatively, the charge transfer device 150 may comprise a circuit within a separate power conditioning module capable of diagnosing electrical problems in the setup (e.g., loss of isolation) and/or capable of estimating total charge transferred to the vehicle.

As shown, one or more electric vehicles 140 may connect to the charging system 100 in order to receive electrical power therefrom. Generally, each vehicle 140 comprises a vehicle power system 142 that includes a battery made up of any number of electrochemical battery cells, capacitors, or supercapacitors (e.g., double-layer capacitors). The vehicle power system 142 may be capable of absorbing and restoring a large quantity of electrical energy at a high rate and with high efficiency. Exemplary electric vehicles may include, but are not limited to trucks, cars, buses, forklifts, autonomous vehicles, drones, motorcycles, trams, and/or other mobile machines and/or storage apparatuses that may be used to transport people and/or cargo.

It will be appreciated that the voltage accepted by a given vehicle power system 142 may vary depending on the type of vehicle 140, with most vehicles requiring a fixed voltage range on the order of about 300V to about 1,000V. Importantly, the disclosed embodiments employ the charge transfer devices 150 and, optionally, the charge nodes 130 to allow for any such vehicle to be charged. Accordingly, in order to receive power from the charging system 100, a vehicle power system 142 may be placed in electrical communication with a charge transfer device 150 and the charge transfer device may, in turn, be placed in electrical communication with a charge node 130 of the charging system 100.

As shown in FIG. 1, in certain embodiments, the charging system 100 may comprise a network 160 to which various components of the system 100 may be connected. The network 160 may include wide area networks ("WAN"), local area networks ("LAN"), intranets, the Internet, wireless access networks, wired networks, mobile networks, telephone networks, optical networks, or combinations thereof. The network 160 may be packet switched, circuit switched, of any topology, and may use any communication protocol. Communication links within the network 160 may involve various digital or an analog communication media such as fiber optic cables, free-space optics, waveguides, electrical conductors, wireless links, antennas, radio-frequency communications, and so forth.

In one embodiment, the system further comprises a central MC system 180, which is generally adapted to maintain processing conditions within acceptable operational constraints throughout the system. Such constraints may be determined by economic, practical, and/or safety requirements. The MC system 180 may handle high-level operational control goals, low-level PID loops, communication with both local and remote users, and communication with both local and remote systems. The MC system 180 may also be in communication with ancillary systems, such as storage systems, backup systems and/or power generation systems In one embodiment, the MC system 180 may be in communication with any number of MC subsystems (181-185) comprising monitoring and control equipment, such as sensors and/or controllers, via the network 160. The MC subsystems may be in further communication with one or more components throughout the charging system 100 such that the MC system 180 may remotely monitor and control operating parameters at various locations. For example, one or more A/C transformers of the power transformation module 110 may be in communication with an MC subsystem 181; one or more power lines of the power distribution module 115 may be in communication with an MC subsystem 182; one or more charge nodes 130 may be in communication with an MC subsystem 183; one or more charge transfer devices 150 may be in communication with an MC subsystem 184; and/or one or more components of a vehicle (e.g., a vehicle power system 142 and/or a vehicle communication unit 144) may be in communication with an MC subsystem 185.

Generally, the MC system 180 may be configured to monitor and/or control parameters, such as but not limited to, voltage, current, frequency, inductance, resistance and/or other relevant electrical properties of electrical connections between system components. For example, the MC system 180 may monitor/control such parameters for a connection between the vehicle 140 and the charge transfer device 150. As another example, the MC system 180 may monitor/control one or more of such parameters for a connection between the charge transfer device 150 and the charge node 130. As yet another example, the MC system may monitor/control such parameters for a connection between the charge node 130 and the power distribution module 115. In another example, the MC system 180 may monitor/control such parameters for a connection between the power transformation module 110 and either the power distribution module 115 or the power supply 105.

In one embodiment, the MC system 180 (e.g., a MC subsystem 184 located at the charge transfer device 150) may communicate with the vehicle 140 using vehicle-specified communications protocols such as OBD-II codes; such communications may include electrical properties of the electrical connection, commands from the vehicle for power conditioning and/or safety, status information about the battery system and/or other relevant vehicle systems, and/or other vehicle information or commands necessary to ensure safe, reliable, efficient electricity transmission to and/or from the vehicle.

In one embodiment, the MC system and/or any of the MC subsystems (181-185) may comprise, or otherwise be connected to, a communication unit to allow communication among the MC system components. Exemplary communication units may comprise one or more readers, scanners, sensors, receivers and/or other input transducers. For example, communication units may include, but are not limited to: keyboards, touchscreens, pointing devices, cameras, video recorders, microphones, radio frequency ID ("RFID") receivers, near field communication ("NFC") receivers, Bluetooth receivers, Bluetooth Low Energy ("BLE") receivers, GPS sensors, WiFi receivers, cellular receivers (CDMA, GSM, LTE, etc.), ZIGBEE receivers, and/or credit card scanners. Exemplary sensors may include relative humidity sensors, moisture sensors, water leak sensors, temperature sensors, voltage sensors, current sensors, switch state indicators, and/or others.

Communication units may additionally or alternatively comprise one or more output transducers. For example, computing units may comprise one or more of the following: RFID transmitters, NFC transmitters, Bluetooth transmitters, BLE transmitters, cellular antennae (CDMA, GSM, LTE, etc.), WIFI transmitters, ZIGBEE transmitters, Ethernet transceivers, monitors, displays, LEDs, speakers, vibration motors and/or other output devices. In the case of wired connections, conductive signals such as electrical signals may be transceived via the same high-voltage power lines or via separate auxiliary power lines.

In one particular embodiment, the communications unit may comprise a CAN connection. For example, an MC subsystem 184 located at a charge transfer device 150 may connect to a vehicle power system 142 and/or other high-voltage components on the vehicle 140 via such connection. It will be appreciated that a CAN connection may be established between the MC subsystem 184 and the vehicle power system 142 (or other vehicle components) and/or among such components and a separate CAN communication hub (e.g., vehicle communications unit 144).

In one embodiment, the MC system 180 and/or the client device 170 may be adapted to receive, determine, record and/or transmit application information relating to one or more components of the charging system 100. The application information may be received from and/or transmitted to the power transformation module 110, power distribution module 115, charge nodes 130, charge transfer devices 150, and/or vehicle 140 via, for example, monitoring and/or control equipment (181, 182, 183, 184, 185, respectively) in communication with one or more components of such systems and in further communication with the network 160. Moreover, any of such application information may be stored in and/or retrieved from one or more local or remote databases (e.g., database 191).

In one embodiment, the MC system 180 may be connected to one or more third-party systems 175 via the network 160. Third-party systems 175 may store information in one or more databases that may be accessed by the MC system 180. Such components may be capable of retrieving and/or storing information from third-party systems 175, with or without user interaction. Moreover, such components may be capable of transmitting stored/received information to such third-party systems. Exemplary third-party systems 175 may include, but are not limited to: registration systems, authorization systems, services management systems, access control systems, security and surveillance systems, financial systems (e.g., billing, invoicing, and/or accounting systems), contact management systems, customer relationship management ("CRM") systems, calendaring systems, mapping systems, communication systems and others.

Figure 2:
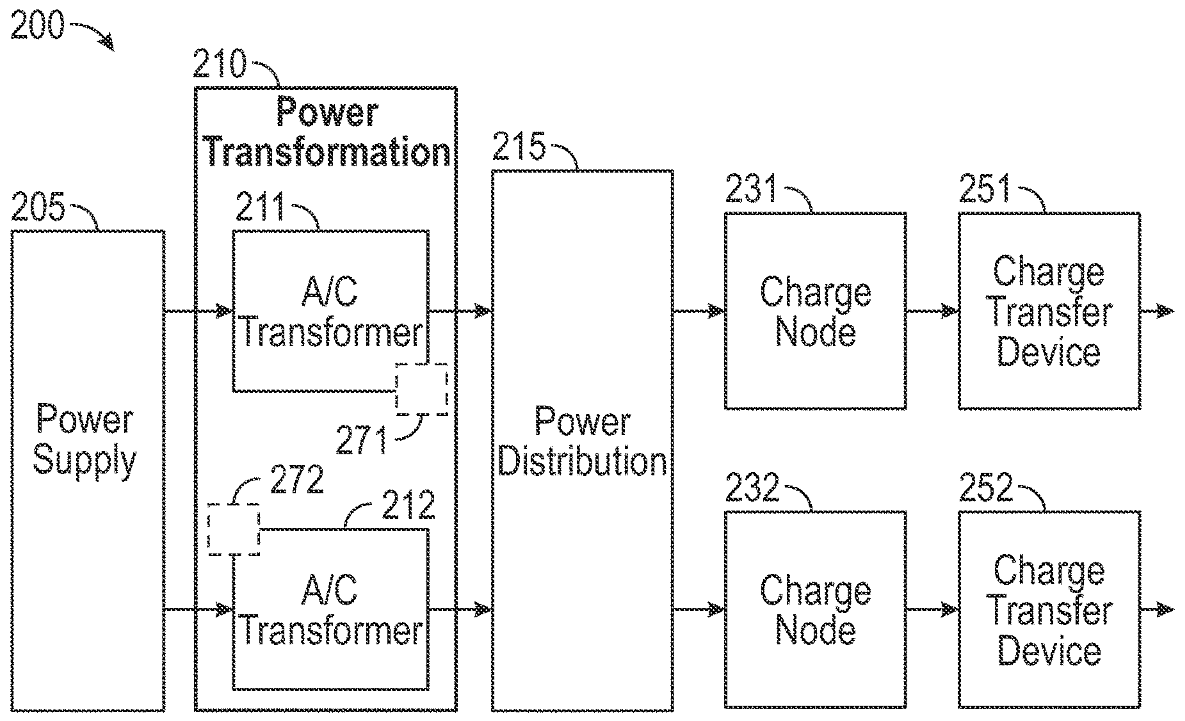
FIG. 2 shows an exemplary charging system according to an embodiment, wherein power conditioning is performed at the power transformation module.
Figure 3:
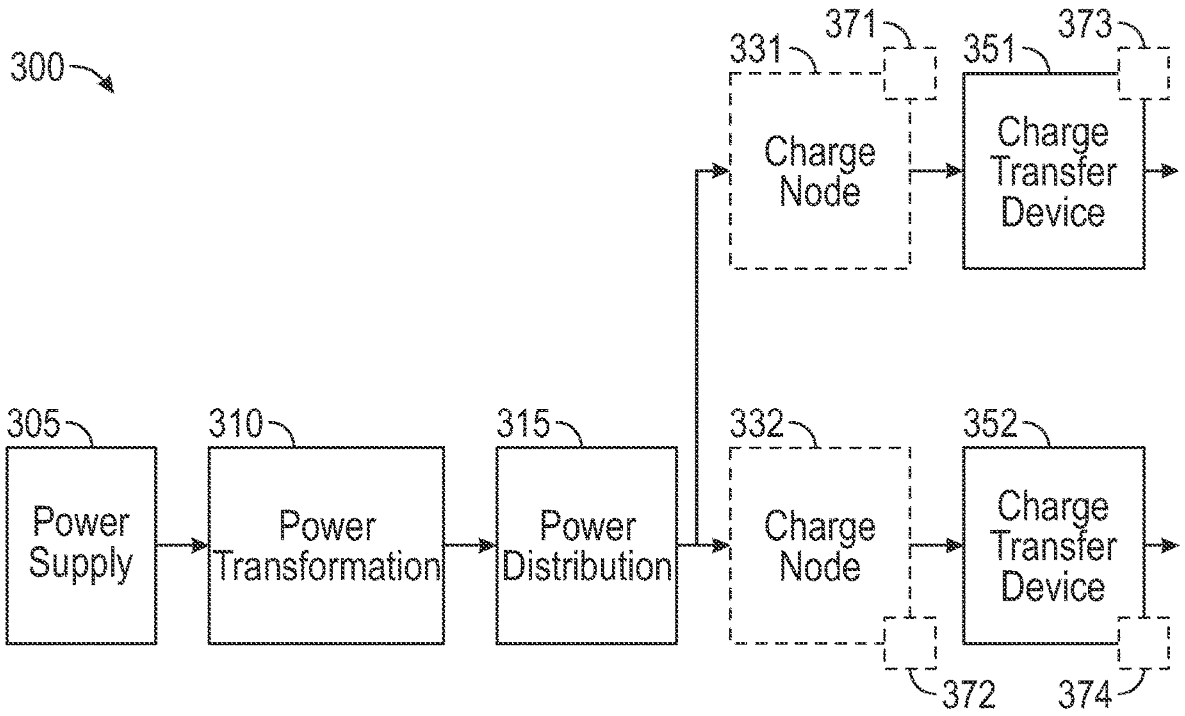
FIG. 3 shows an exemplary system according to an embodiment, wherein power conditioning is performed at the charge nodes and/or at the charge transfer devices.

Referring to FIGS. 2-3, exemplary charging systems 200, 300 are illustrated to include power conditioning modules 271, 272, 371, 372, 373, 374 at various locations. FIG. 2 shows an embodiment wherein power conditioning is primarily achieved via modules 271, 272 located within the power transformation module 210. And FIG. 3 shows embodiments wherein power conditioning may be achieved via modules 371-374 located at the charge nodes 331, 332 or the charge transfer devices 351, 352.

Generally, a power conditioning module may comprise electrical components to control the current provided to, or received from, a vehicle. In certain embodiments, the power conditioning module may comprise components, such as a variable resistor, IBGTs, electrical contactors, fuses and/or other circuit elements capable of controlling circuit current. These controllable elements may have preset limits and responses to system currents, for example in a firmware look up table, or may be controlled by a central MC system (e.g., FIG. 1 at 180).

In one embodiment, the power conditioning module may additionally or alternatively comprise one or more of: a hall effect current sensor, a transformer or current clamp meter, a fluxgate transformer type, a circuit with resistor and voltage sensor, a fiber optic current sensor using interferometry, or a Rogowski coil. In one embodiment, the module may comprise a shunt resistor and voltage measurement may be employed to determine current.

In the case of a conductive connection between the vehicle and the charging system, the power conditioning module may comprise means to pre-charge the connection point on the charging system side, such as a pre-charge circuit that includes a relatively high-resistance resistor and/or inductor in series with an appropriately sized contactor, both of which are in parallel to the main high-voltage connection contactor.

In the case of an inductive charging connection between a vehicle and the charging system, the power conditioning module may comprise appropriate electric circuits to power a wireless charging device accounting for inductance, resistance, and other relevant properties of the wireless charging device.

As shown in FIG. 2, the system 200 may comprise a power transformation module 210 comprising a plurality of AC/DC transformers 211, 212 connected to a power supply 205, such as a utility transformer. Each of the AC/DC transformers 211, 212 may also be in electrical communication with a charge node 231, 232 via a power distribution module 215 comprising power lines. In turn, each charge node 231, 232 is in further electrical communication with a charge transfer device 251, 252.

In such embodiment, each AC/DC transformer 211, 212 may receive an alternating current (e.g., at about 480 V) from the power supply 205. And, by employing power conditioning functionality 271, 272, each AC/DC transformer 211, 212 may condition the received alternating current to an electrical signal having appropriate characteristics for distribution to a vehicle via power distribution module 215, the charge node 231, 232 and the charge transfer device 251, 252. For example, each power conditioning module 271, 272 may condition the received electrical signal to a direct current of from about 775 V to about 825 V.

It will be appreciated that such configuration generally allows the system to deliver power to vehicles at an appropriate vehicle voltage while reducing technical challenges of installing power conditioning devices within charge nodes 231, 232 and/or charge transfer devices 251, 252.

Referring to FIG. 3, an exemplary system 300 is illustrated wherein power conditioning is primarily achieved via the charge nodes 331, 332 or the charge transfer devices 351, 352, rather than the power transformation module 310. As shown, the system 300 may comprise power transformation module 310 comprising a single AC/DC transformer in electrical communication with a power supply 305 (e.g., a utility transformer) and a plurality of charge nodes 331, 332 (via power distribution module 315). In turn, each charge node 331, 332 is in further electrical communication with a charge transfer device 351, 352.

In one such embodiment, the AC/DC transformer may transform an alternating current received from the electricity source (e.g., 480 VAC) to a high-voltage direct current (HVDC) of about 10,000 V. The HVDC may then be distributed, via power distribution lines, to power conditioning modules 371, 372 located at the charge nodes 331, 332 for conditioning. For example, each power conditioning module may condition the HVDC to a suitable voltage (e.g., about 775V to about 800 V) for transfer to a vehicle via a charge transfer device 351, 352.

In an alternative embodiment, the HVDC may be conditioned by power conditioning modules 373, 374 located at the charge transfer devices 351, 352, rather than the charge nodes. For example, the HVDC may be distributed from the AC/DC transformer, through the power distribution lines, to the charge nodes 331, 332, and then from each charge node to a charge transfer device 351, 352 for conditioning. In such case, the power conditioning modules 373, 374 located at each charge transfer device may condition the HVDC to a suitable voltage for transfer to a vehicle power system (e.g., about 775 V to about 800 V).

It will be appreciated that, in an alternative embodiment, each charge transfer device 351, 352 may receive the HVDC directly from the power distribution module 315. In such embodiment, power conditioning modules 373, 374 located at each charge transfer device 351, 352 may transform the HVDC to a suitable voltage for transfer to a vehicle power system (e.g., about 775 V to about 800 V).

Figure 4:
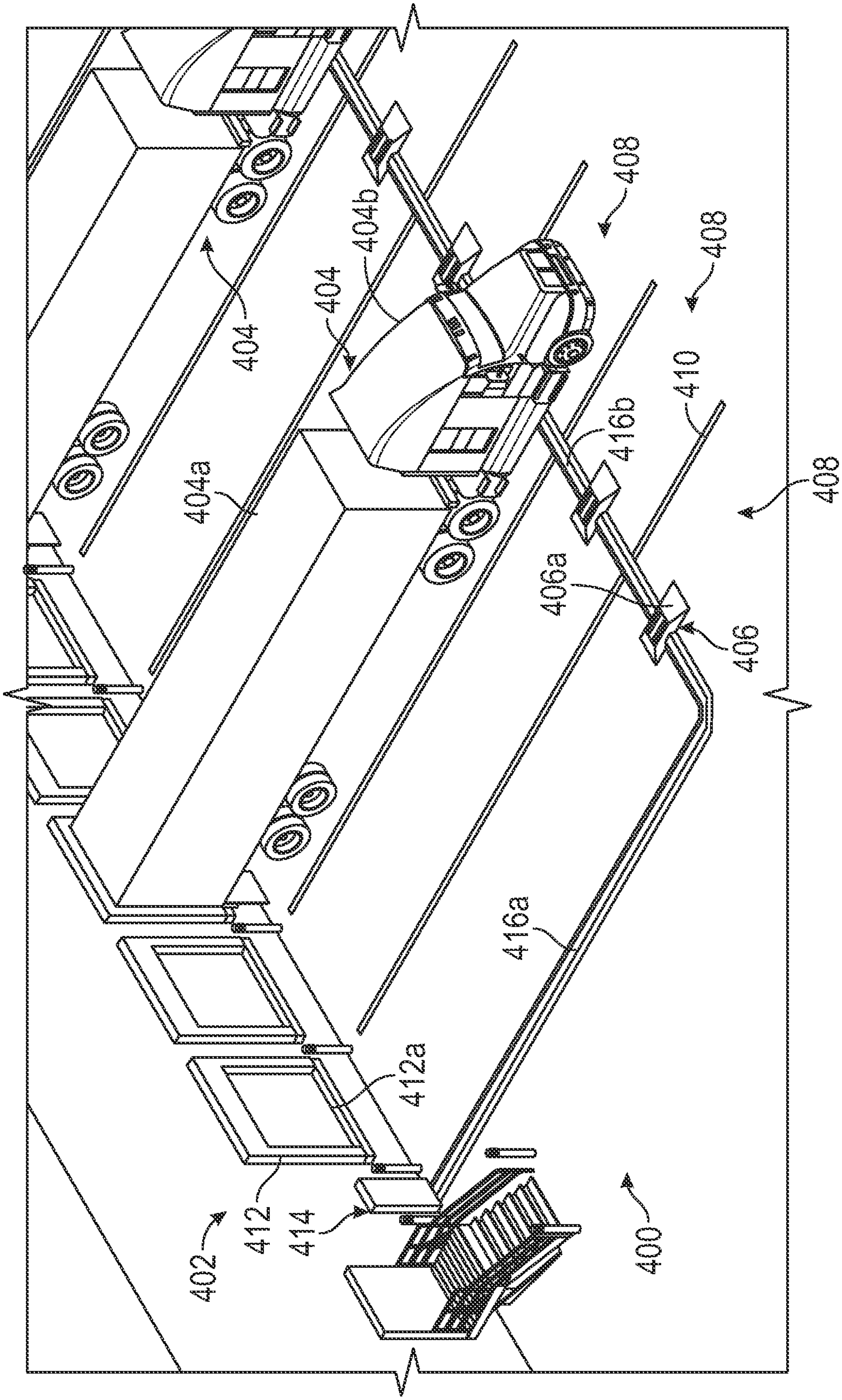
FIG. 4 illustrates a perspective view of a charging site in the form of a parking lot of loading dock in which two electric vehicles in the form of semi-trucks are being charged by a charging system including a plurality of charging stations in the form of charging nodes.

FIG. 4 illustrates a perspective view of a charging site 400 in the form of a parking lot of loading dock 402 in which two electric vehicles in the form of semi-trucks 404 are being charged by a charging system including a plurality of charging stations in the form of charging nodes 406. Charging site 400 includes a plurality of parking spaces 408 each delimited by at least one line 410 directly affixed to the surface of the ground. Lines 410 may be decals fixed to the ground or may be painting on the ground. Charging nodes 406 are installed in at least some of the parking spaces 408 directly on the surface of the ground within the respective parking space 408. In FIG. 4, each parking space 408 is aligned with and abuts a raised entryway in the form of a loading port 412 of the locking dock 402, allowing operators to load a trailer 404*a* of the truck 404 with freight while the charging nodes 406 charges the electric battery of a tractor 404*b* of the truck 404. Each of loading ports 412 can be accessible via a door 412*a* that can be raised and lowered so that good can be loaded into semi-trucks 404 or taken out of semi-trucks 404.

Each of the charging nodes 406 are electrically connected to a power source 414 for charging the semi-trucks 404. Power source 414 may include or be connected to a power supply 105 and may include a power transformation module 110. Power source 414 may be connected to nodes 406 by a plurality of cables positioned on top of the ground and passing over lines 410. The cables run underneath linear covers 416*a*, 416*b*, which are installed directly on the surface of the ground. Linear cover 416*a* extends from power source 414 parallel to lines 410 and linear covers 416*b* extend perpendicular to and pass over lines 410. Linear covers 416*b* directly connect to housings 406*a* of charging nodes 406.

In some embodiments, each of the charging nodes 406 may have an installed height of between 3 and 7 inches such that a semi truck 404 can drive into position above the charging node 406. Specifically, the charging nodes 406 are sized to be positioned below the chassis of the tractor 404*b*. This allows charging nodes 406 to be installed directly within existing parking spaces 408 at loading dock 402 without damaging the existing ground surface of the parking lot 400. In particular, charging nodes 406 are installed on the surface of the ground such that trenches do not have be dug into the asphalt or concrete to install charging nodes 406. In some embodiments, the charging nodes 406 can be fixed to the surface of the ground by fasteners passing through the housing 406*a* into the ground. The fasteners can for example bolts, screws or anchors. In other embodiments, the charging nodes 406 can be fixed to the surface of the ground by adhesive. Unlike conventional designs, charging nodes 406 do not require the laying of concrete pads and do not require the installation of ballards to protect the charging nodes 406.

Figure 5:
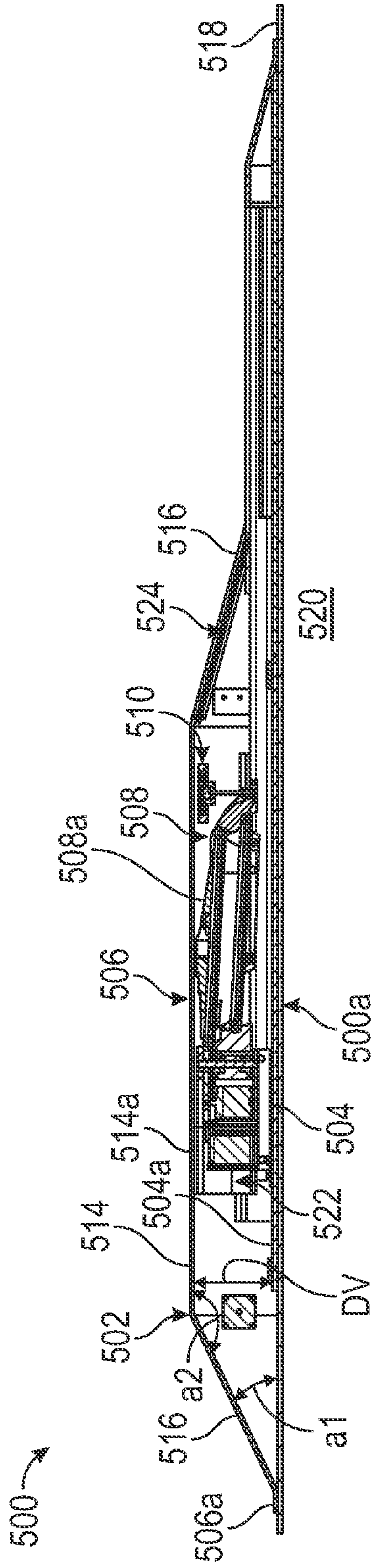
FIG. 5 illustrates a cross-sectional side view of an electric vehicle charging station, according to some embodiments of the present disclosure.

FIG. 5 illustrates a cross-sectional side view of an electric vehicle charging station 500, according to some embodiments of the present disclosure. Station 500 may include a housing 502 including a base plate 504 and an enclosure 506. Station 500 may further include a charging arm 508 within the housing 502, and an electrical connector 510 mounted on the charging arm 508 and configured for emitting electricity from the charging station 500. The housing 502 may include a top wall 514. The housing 502 may also include side walls 516 extending downward from the top wall 514. Top wall 514 and side walls 516 can be completely immovable. In other words, top wall 514 and side walls 516 are stationary and do not move during movement of the electrical connector 510 in and out of the housing 502. Housing 502 is configured for being connected in contact with a surface 518 of the ground 520. More specifically, at least one of enclosure 506 and base plate 504 and configured for being connected in direct contact with surface 518 of ground 520. In the embodiment shown in FIG. 4, both base plate 504 and enclosure 506 are configured for being in direct content with surface 518, which can be a driving surface including roadway, for example a concrete or asphalt parking lot surface. In other words, station 500 is configured for being mounted entirely above ground with a bottom surface 500*a* of the station 500 parallel to a surrounding roadway.

Figure 7:
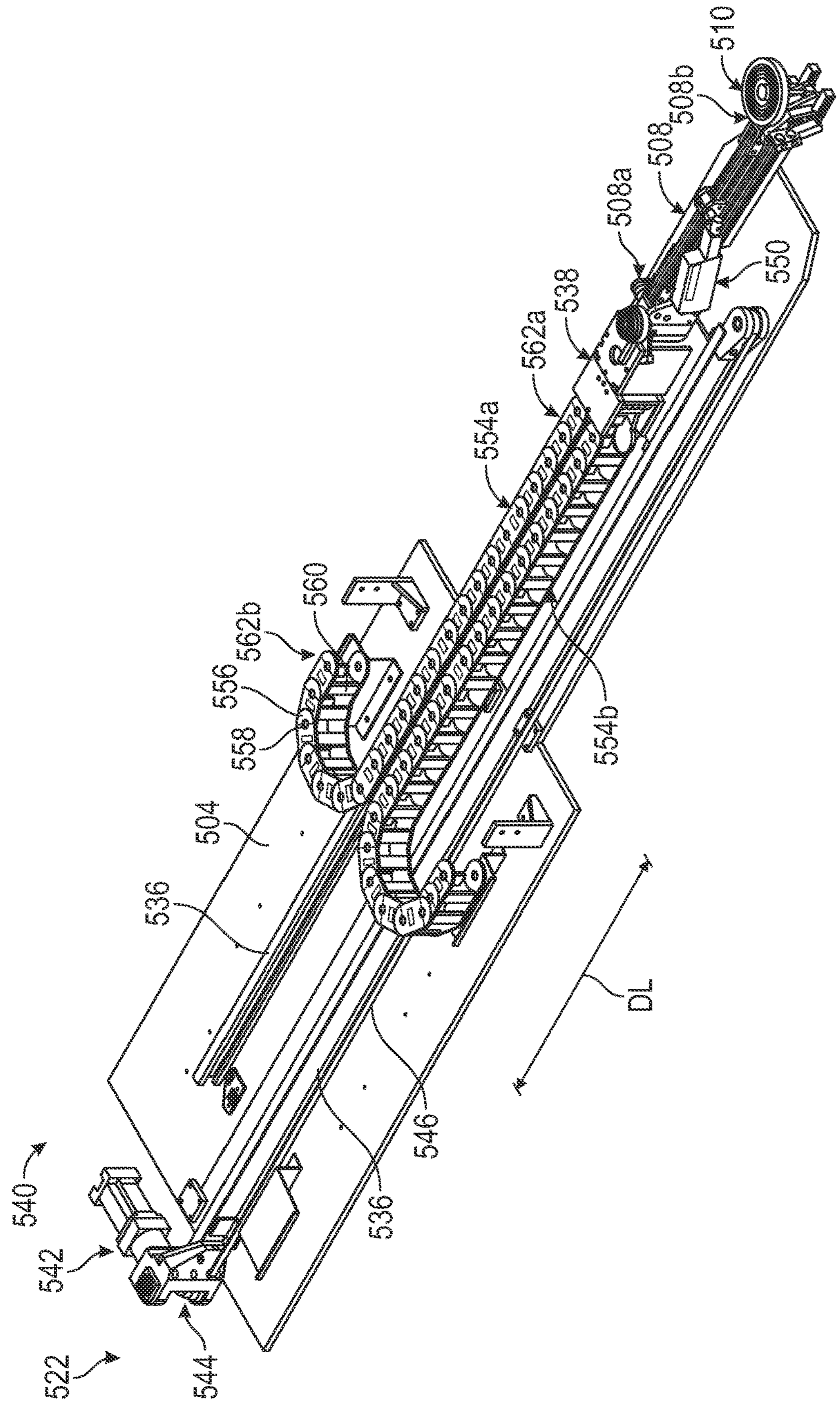
FIGS. 7 to 9 show the progression of the electrical connector from the first position within the housing to the second position outside of the housing and an intermediate position between the first and second positions.

The charging station 500 may include an actuator 522 configured for moving the charging arm 508 such that the electrical connector 510 and an upper surface 508*a* of charging arm 508 moves through a hole 524 in the housing 502 between a first position, shown in FIG. 4, in which the electrical connector 510 is inside housing 502, and a second position, in which electrical connector 510 is outside of housing 502 (the position in FIG. 7). In the first position, the electrical connector 510 may be within the housing 502 vertically between the base plate 504 and the top wall 514. In the second position, electrical connector 510 may be outside of side walls 516 and no longer under top wall 514. Housing 502 is configured for protecting the charging arm 508, and the actuator 522 from being damaged by external objects or substances, which can include vehicles, liquids, rain, snow, debris and dust, when the electrical connector 510 is in the first position inside the housing 502.

In some embodiments, an uppermost surface 514*a* of the top wall 514 may be spaced from a bottommost surface 504*a* of the base plate 504 by a vertical distance DV of 3 to 7 inches. The bottommost surface 504*a* of the base plate 504 may be configured for resting directly on the surface 518 of the ground 520. A bottommost surface 506*a* of enclosure 506, as defined by bottom edges of side walls 516, may also be configured for resting directly on the surface 518 of the ground 520. The hole 524 in the housing 502 may be in at least one of the side walls 516, and the actuator 508 may be configured for moving the electrical connector 510 horizontally through the hole 524.

In some embodiments, at least one of the side walls 516 may be sloped at an angle a1 of between 15 and 60 degrees with respect to surface 518 the ground 520 and an angle a2 of 105 to 150 degrees with respect to top wall 514 such that housing 502 can be easily driven over by a wheels of vehicle without damaging the charging station 500 or the vehicle. Uppermost surface 514*a* of top wall is substantially (+/−15 degrees) parallel to surface 518, and in some embodiments is parallel to surface 518. In some embodiments, angle a1 is between 20 and 45 degrees.

Figure 6:
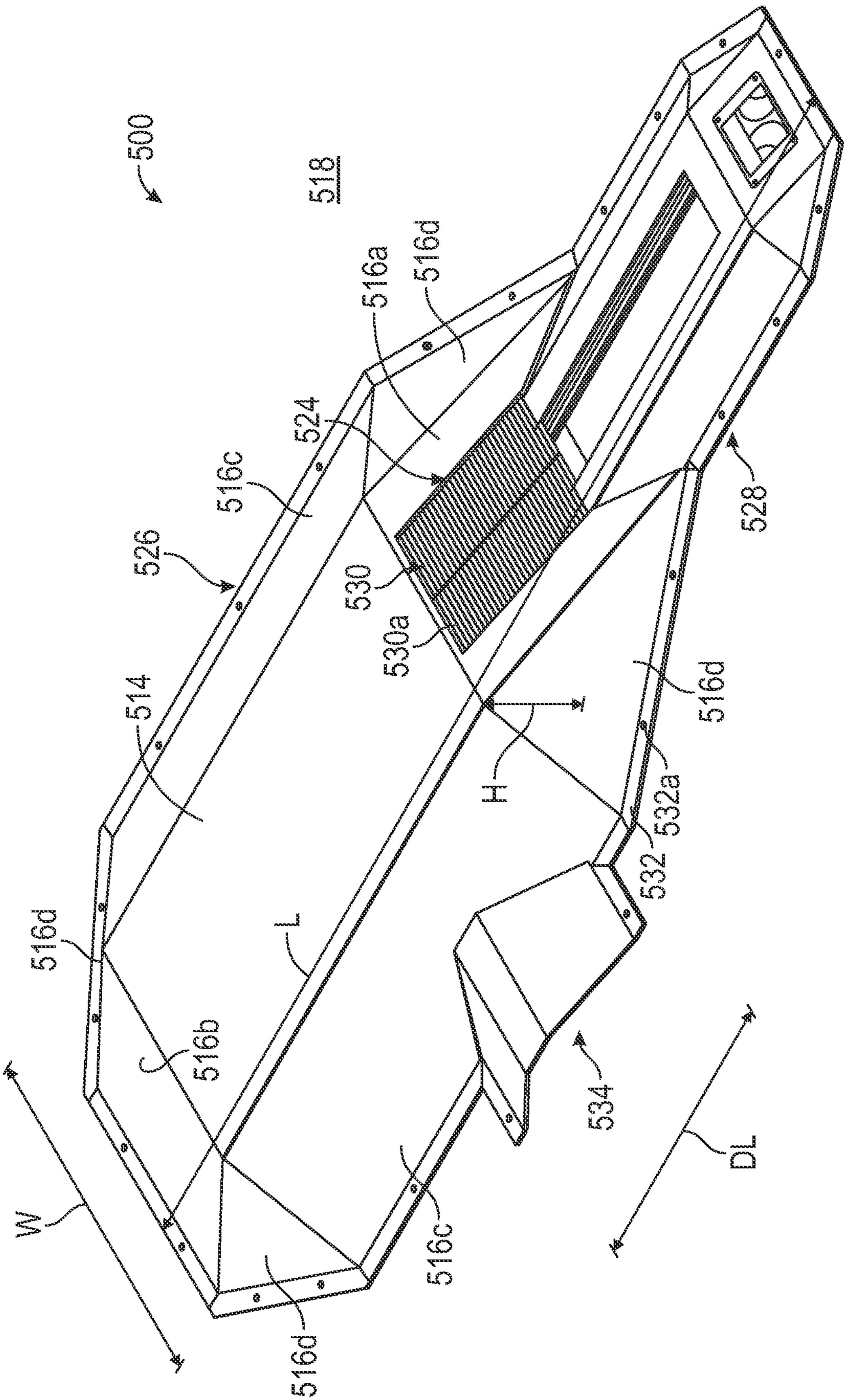
FIG. 6 shows a perspective view of charging station with the electrical connector in the first position inside housing.

FIG. 6 shows a perspective view of charging station 500 with the electrical connector 510 in the first position inside housing 502. As shown in FIG. 6, enclosure 506 may include a storage section 526 for storing the charging arm 508 and electrical connector 510 when electrical connector 510 is in the first position and a guide section 528 for guiding the travel of the charging arm 508 outside of housing 502.

In the arrangement shown in FIG. 6, storage section 526 includes top wall 514 and a plurality of side walls 516 including a front side wall 516*a*, a rear side wall 516*b*, two lateral side walls 516*c*, and four corner side walls 516*d*. Hole 524 is provided in front side wall 516*a*, and a protective penetrable door 530 covers hole 524. Door 530 helps to prevent outside substances—for example, dust, debris, rain or snow—from entering into housing 502, while allowing charging arm 508 and electrical connector 510 to pass through door 530. In some embodiments, door 530 is formed by a plurality of strips 530*a* connected to side wall 516*a*. More specifically, door 530 is formed by two groups of strips 530*a*—one group extending from one side of hole 524 and another group extending from the other side of hole 524, with the groups of strips 530*a* meeting in the middle of hole 524.

In the arrangement shown in FIG. 6, each of side walls 516*a* to 516*d* is sloped at a non-perpendicular angle with respect to the surface 518 of the ground. Each of side walls 516*a* to 516*d* can be sloped at angle between 15 and 60 degrees with respect to surface 518 the ground 520 and an angle of 105 to 150 degrees with respect to top wall 514 such that housing 502 can be easily driven over by wheels of vehicle without damaging the charging station 500 or the vehicle. At the bottom of each of side walls 516*a* to 516*d*, each side wall 516*a* to 516*d* includes a flange 532 for resting in contact on top of surface 518. Flanges 532 may include holes 532*a* for receiving fasteners for fixing charging station 500 to the ground on top of surface 518.

Housing 502 has a width W, a height H and a length L. Height H (which is equal to the vertical distance DV in FIG. 5) is less than the width W and the length L and width W is less than the length L. The length L defines a longitudinal direction DL of the charging station 500 and the actuator 522 is configured for moving the charging arm 508 in the longitudinal direction DL between the first position and the second position.

FIG. 7 shows a perspective view of charging station 500 with enclosure 506 omitted to illustrate actuator 522, base plate 504 and electrical connector 510. In some embodiments, the actuator 522 may also include a first actuator 540 for moving the electrical connector 510 along a horizontal path out of the housing 502 and a second actuator 550 for moving the electrical connector 510 vertically outside of the housing 502.

Actuator 522 may include at least one rail 536 rigidly fixed to the base plate 504 and a carriage 538 movable along the at least one rail 536 during movement of the electrical connector 510 between the first and second positions. In the arrangement shown in FIG. 7, actuator 522 includes two parallel rails 536, with the carriage 538 being laterally between the rails 536 and movable in the longitudinal direction DL along the rails 536. The charging arm 508 is fixed to the carriage 538 and the electrical connector 510 is fixed to the charging arm 508, such that moving the carriage 538 horizontally along the rails 536 moves electrical connector 510 horizontally. More specifically, referring to FIGS. 5 to 7 together, when electrical connector 510 is in the first position, carriage 538 is in the storage section 526 of enclosure 506 directly below top wall 514, and when electrical connector 510 is in the second position carriage 538 is positioned along guide section 528 of enclosure 506.

In some embodiments, the first actuator 540 is configured for moving the carriage 538 horizontally along the at least one rail 536. In some embodiments, horizontal actuator 540 may include an electric motor 542, a drive transmission 544 and a drive loop 546 drivingly coupling the electric motor 542 to the carriage 538. Drive loop 546 wraps around one of rails 536 and is driven in a continuous loop around the rail 536 by drive transmission 544, which is driven by electric motor 542. As drive loop 546 travels along rail 536, carriage 538 moves horizontally along rail 536 in the longitudinal direction DL to move electrical connector 510 between the first and second positions.

Figure 12:
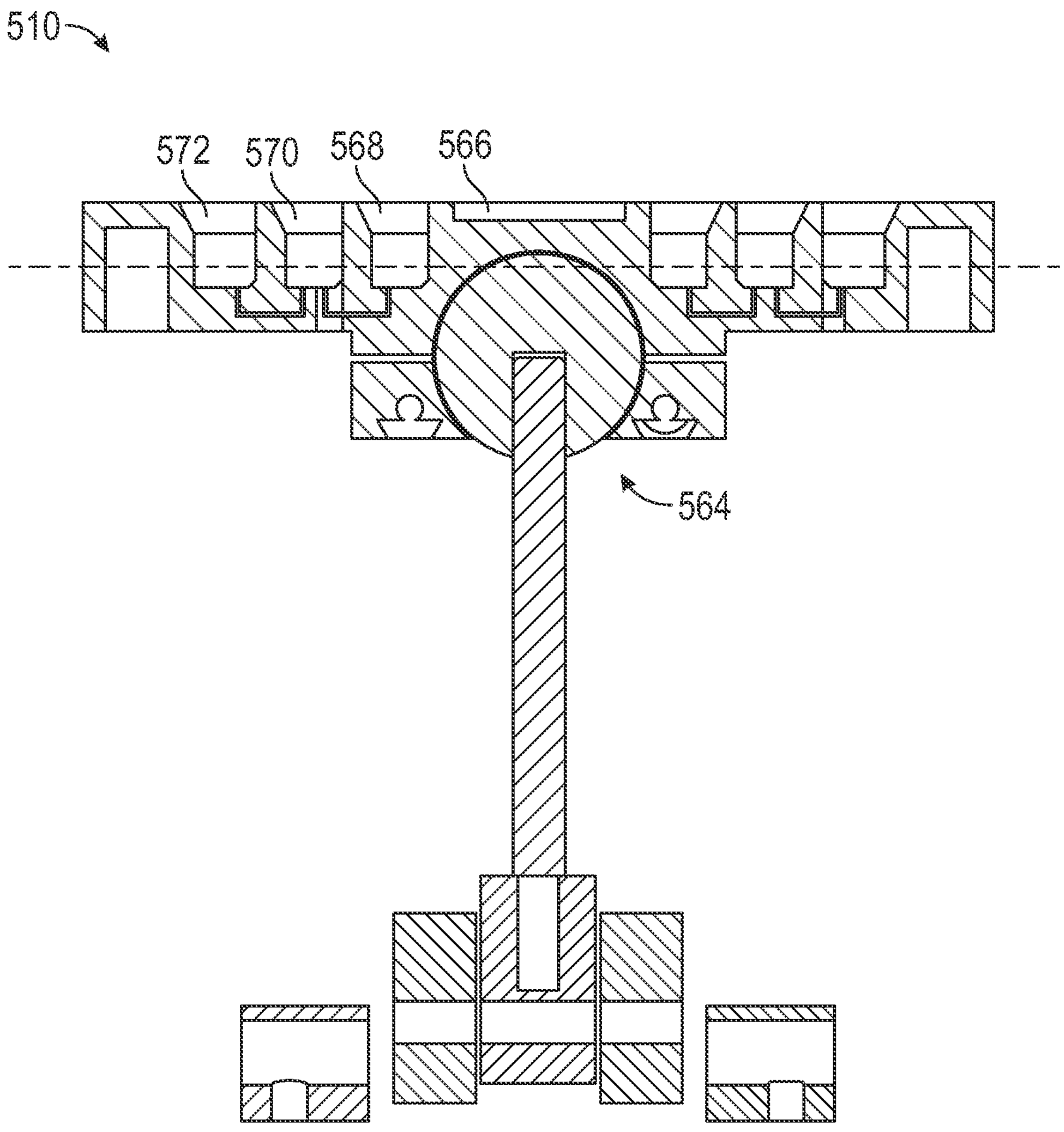
FIG. 12 shows a front cross section view of the electrical connector.

A first end 508a of the charging arm 508 may be fixed to the carriage 538 and a second end 508b of the charging arm 508 may be fixed to electrical connector 510. The electrical connector 510 may be movably mounted on the charging arm 508. In some embodiments, the electrical connector 510 may be movable in three dimensions with respect to the charging arm 508. Electrical connector 510 may be movably mounted on the charging arm 508 via a ball joint 564 (FIG. 12). The electrical connector 510 is mounted on the ball joint 564 for pivoting in three dimensions and providing a passive correction of up to +/−20° angular misalignment.

Charging arm 508 is pivotably fixed to carriage 538 such that charging arm 508 is movable vertically. Second actuator 550 may be further configured for moving charging arm 508 after the electrical connector 510 is moved in the longitudinal direction out of the housing 502 through the hole 524. Second actuator 550 is fixed to carriage 538 at one end and fixed to arm 508 at the other end. Specifically, second actuator 550 may be a linear actuator that extends in length to pivot second end 508b of arm 508 upward, moving electrical connector 510 upward to connect with an electrical receptacle on board the vehicle to charge a battery onboard the vehicle.

Charging station 500 further includes at least one flexible movable cable carrier 554a, 554b to prevent cables supplying electricity to electrical connector 510 from being tangled during the movement of arm 508 and electrical connector 510. The cables are not shown in FIG. 7, but they run within cable carriers 554a, 554b. The first flexible cable carrier 554a and the second flexible cable carrier 554b each includes a plurality of lugs 556 pivotably connected together by pins 558 to allow carriers 554a, 554b to bend during movement. Carriers 554a, 554b further include supports 560 connecting lugs 556 to define a space within the carriers 554a, 554b for receiving the cables. More specifically, each carrier 554a, 554b includes two sets of lugs 556—a bottom set of lugs 556 and a top set of lugs 556, and each of the lugs 556 from the top set is connected to one of the lugs 556 of the bottom set by two of the supports 560, such that the cable receiving space is delimited between the top set of lugs 556, the bottom set of lugs 556 and the supports 560. First ends 562a of carriers 554a, 554b are fixed to carriage 538 and second ends 562b of carriers 554a, 554b are fixed to base plate 504. Second ends 562b are configured for remaining stationary during movement of the electrical connector 510 between the first and second positions, and first ends 562a are configured for moving during movement of the electrical connector 510 between the first and second positions. Accordingly, the movement of carriage 538 in the longitudinal direction DL by actuator 540 causes first end 562a of each carrier 554a, 554b to move with carriage 538.

Figure 8:
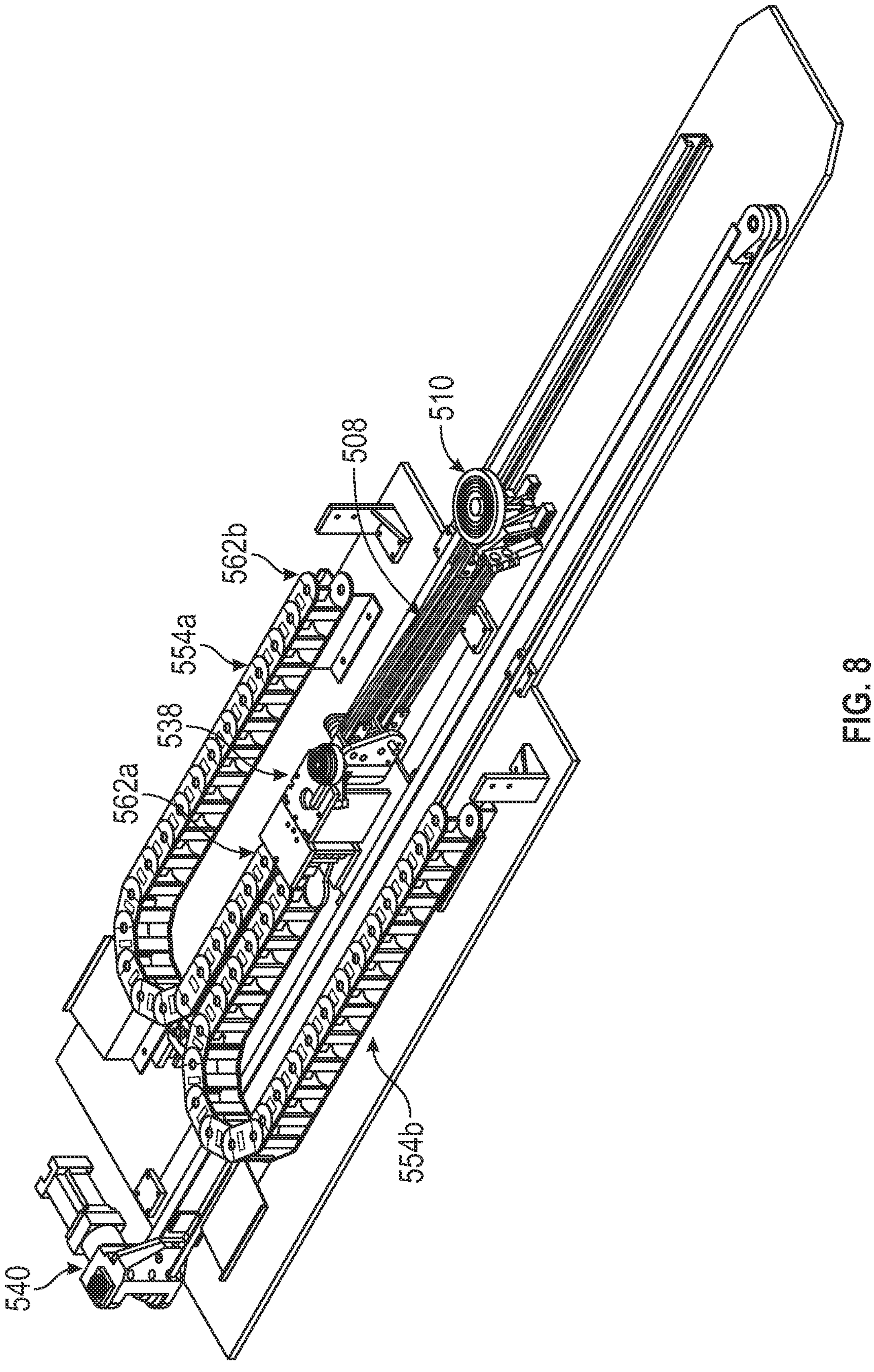
Figure 9:
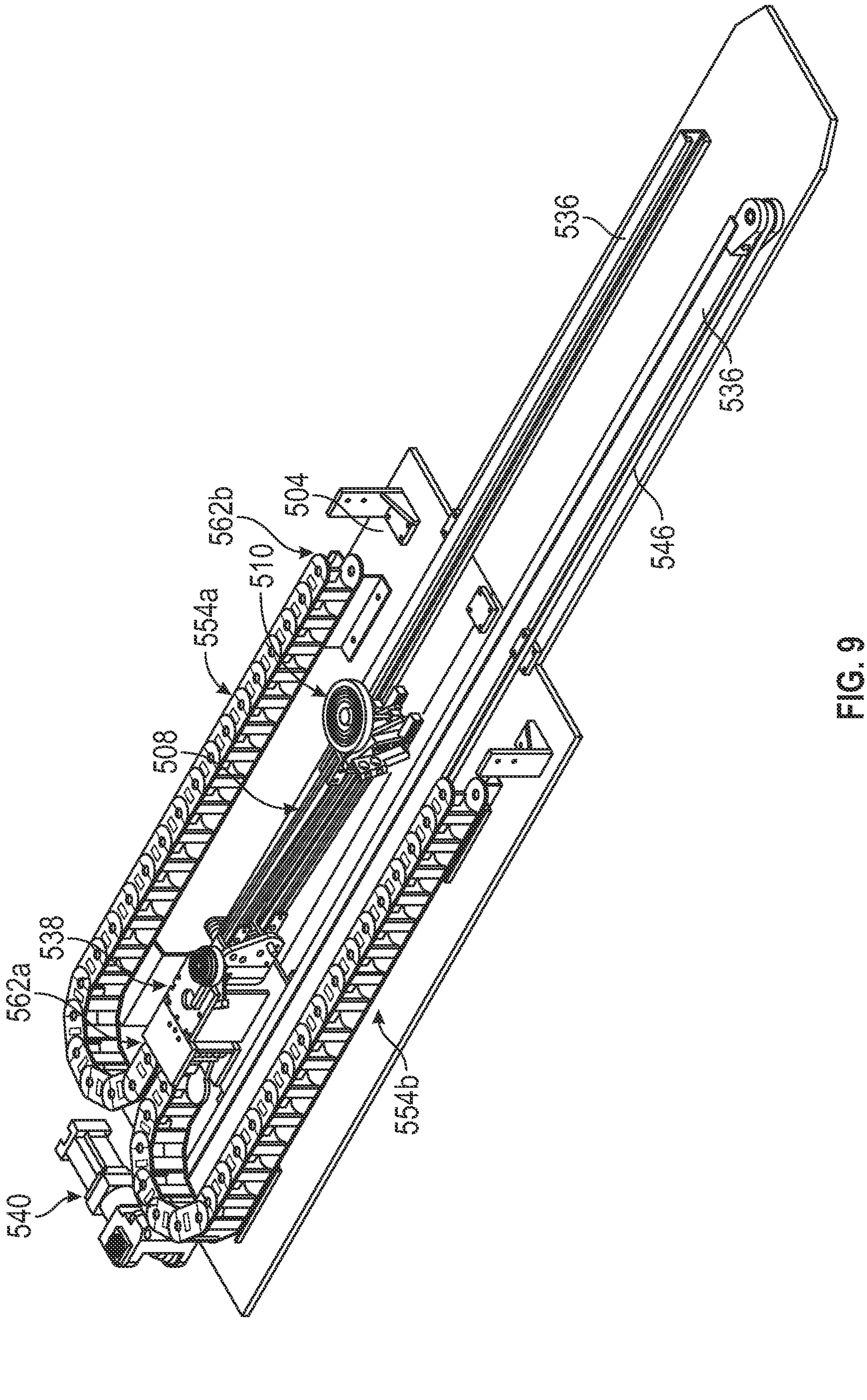

FIGS. 7 to 9 show the progression of the electrical connector 510 from the first position within the housing 502 (FIG. 9) to the second position outside of the housing 502 (FIG. 7) and an intermediate position between the first and second positions (FIG. 8). FIGS. 7 to 9 illustrate that the first and second flexible cable carriers 554a, 554b are each configured for first decreasing in effective length with respect to longitudinal direction DL while the electrical connector 510 is moved from the first position to a midway intermediate position in which first ends 562a and second ends 562b of carriers 554a, 554b are at the same position in the longitudinal direction (not shown—between the positions shown in FIGS. 7 and 8), then increasing in effective length while the electrical connector 510 is moved in the longitudinal direction from the midway intermediate position to the second position.

The first flexible cable carrier 554a and the second flexible cable carrier 554b each have a J-shape when the electrical connector 510 is in the first position, a U-shape when the electrical connector 510 is in an intermediate midway position between the first and second positions, and a J-shape when the electrical connector 510 may be in the second position.

Figure 10:
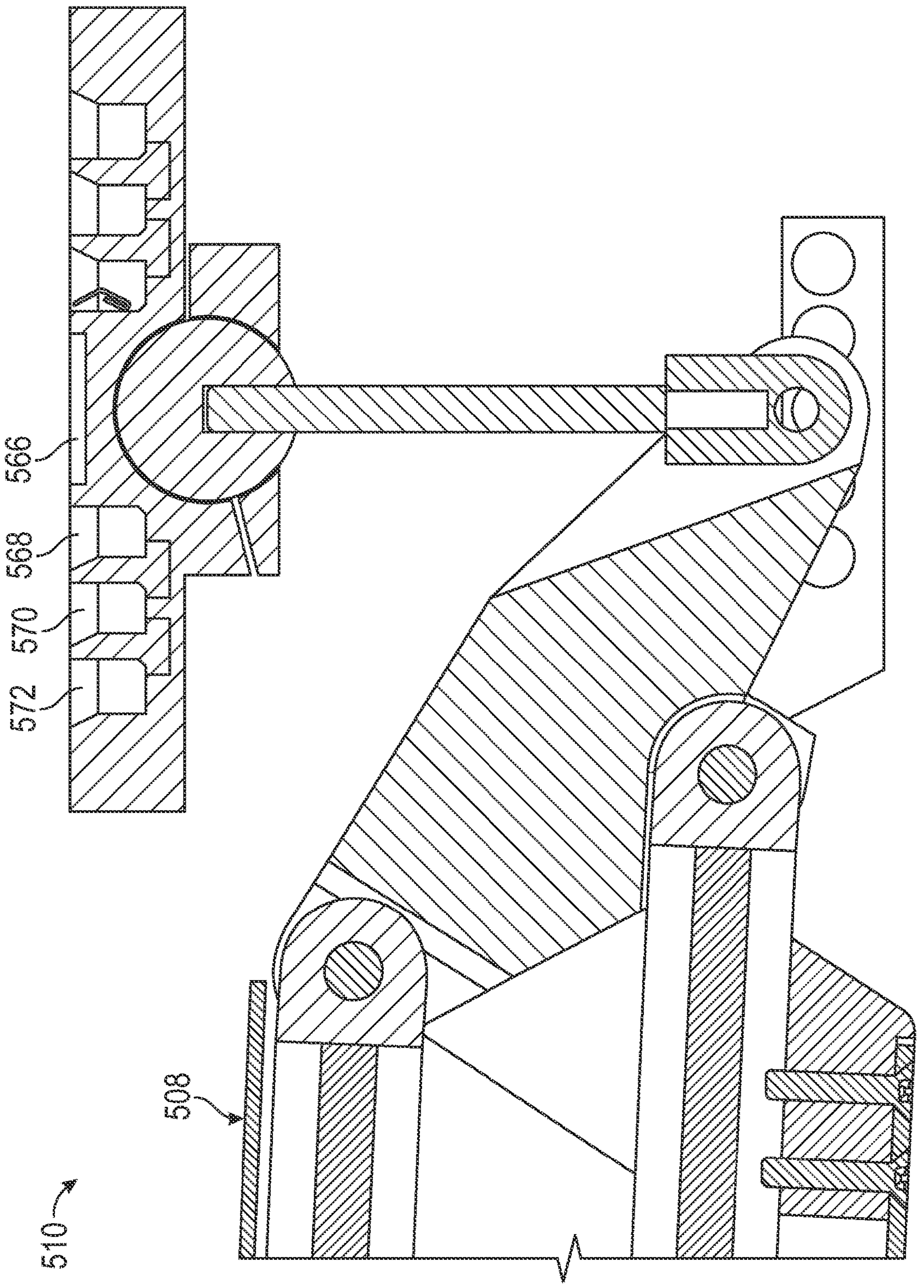
FIG. 10 shows a side cross section view of a portion of the electrical connector.
Figure 11:
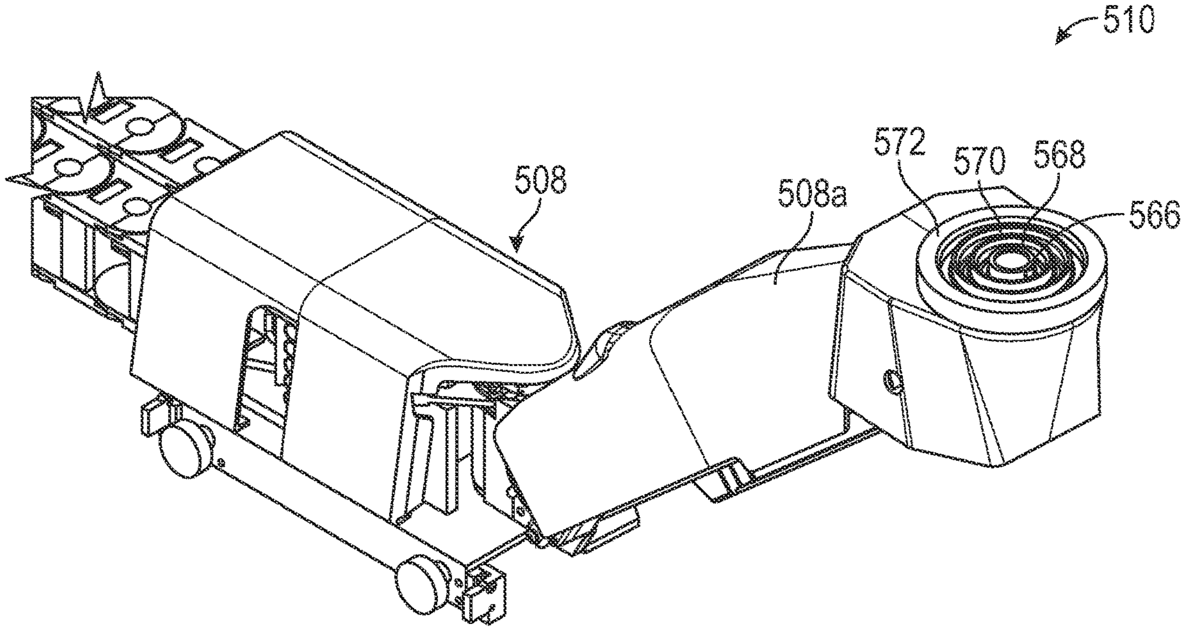
FIG. 11 shows a perspective view of the electrical connector.

FIGS. 10 to 12 show different views of electrical connector 510. To allow seamless alignment of electrical connector 510 with the corresponding electrical receptacle, electrical connector 510 may be movably mounted on the charging arm 508. In some embodiments, the electrical connector 510 may be movable in three dimensions with respect to the charging arm. In the arrangement shown in FIGS. 10 to 12, this is accomplished via movably mounting electrical connector 510 on the charging arm 508 via a ball joint 564.

Electrical connector 510 may have a concentric shape, an axisymmetric shape and/or a coaxial shape. More specifically, contacts 566, 568, 570, 572 may have a concentric shape, an axisymmetric shape and/or a coaxial shape. This can be achieved by each of contacts 566, 568, 570, 572 having a circular ring shape. The contacts of connector 510 may include a data transfer contact 566, a ground contact 568, a negative electrical contact 570, a positive electrical contact 572. In the arrangement shown in FIGS. 10 to 12, contacts 566, 568, 570, 572 are protruding rings, more specifically cylindrical rings, configured for engaging with contacts of an electrical receptacle fixed to the vehicle being charged and have a concentric shape, an axisymmetric shape and a coaxial shape.

Figure 13:
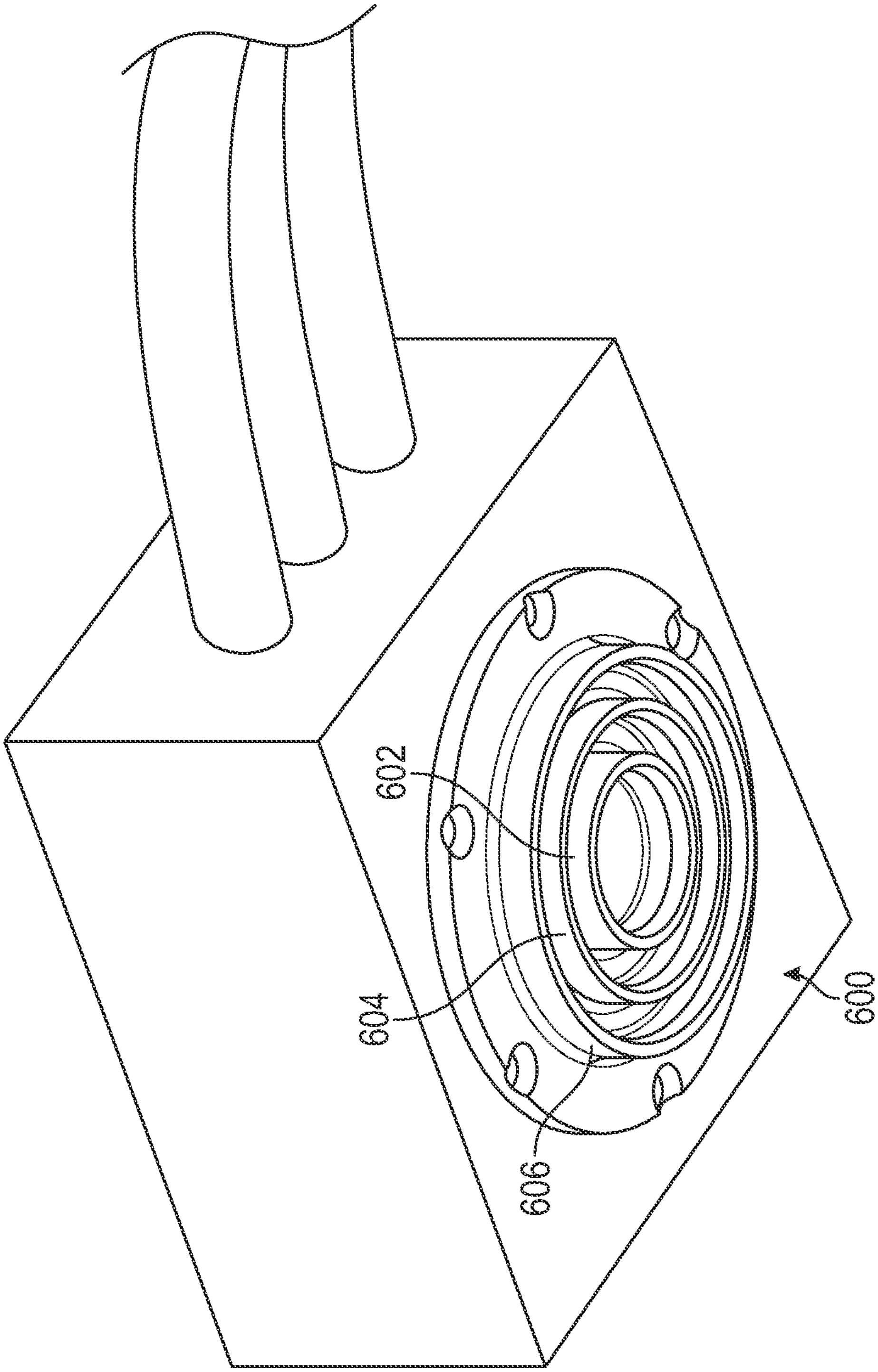
FIG. 13 shows an example of an electrical receptacle for being fixed to a vehicle.

FIG. 13 shows an example of a charging receptacle 600 configured for being fixed to a vehicle. Charging receptacle 600 is configured for mating with the electrical connector, the charge receiver configured for providing electricity from electrical connector 510 to a battery onboard the electric vehicle. Charging receptacle 600 may have a concentric shape. More specifically, contacts 602, 604, 606 may have a concentric shape, an axisymmetric shape and a coaxial shape. This can be achieved by each of contacts 602, 604, 606 having a circular ring shape. The contacts of receptacle 600 may include a data transfer contact 602, a positive electrical contact 604 and a negative electrical contact 606. In the arrangement shown in FIG. 13, contacts 602, 604, 606 are cylindrical rings configured for intermeshing engagement with 566, 568, 570 of connector 510.

A method of charging an electric vehicle can include fixing a charging node 500 including an electrical connector 510 above the surface of a roadway, and fixing a charging receptacle 600, which is configured for intermeshing with the electrical connector 510, to the electric vehicle below a chassis of the electric vehicle. The method can then include, sensing, via the charging node, when the chassis of the electric vehicle is in position above the charging node 500 and the charging receptacle 600 is within a predetermined distance of the charging node 500. Then, the method includes moving, by the actuator 508, the electrical connector 510 from the first position to the second position and then forcing the electrical connector 510 into intermeshing engagement with the charging receptacle 600. Next, the method includes charging, with the electrical connector 510 in intermeshing engagement with the charging receptacle 600, a battery of the electrical vehicle via the charging node 406, 500. After the charging of the battery, the electrical connector 510 is moved, by the actuator 508, out of intermeshing engagement with the charging receptacle 600 and from the second position to the first position.

Figure 14A:
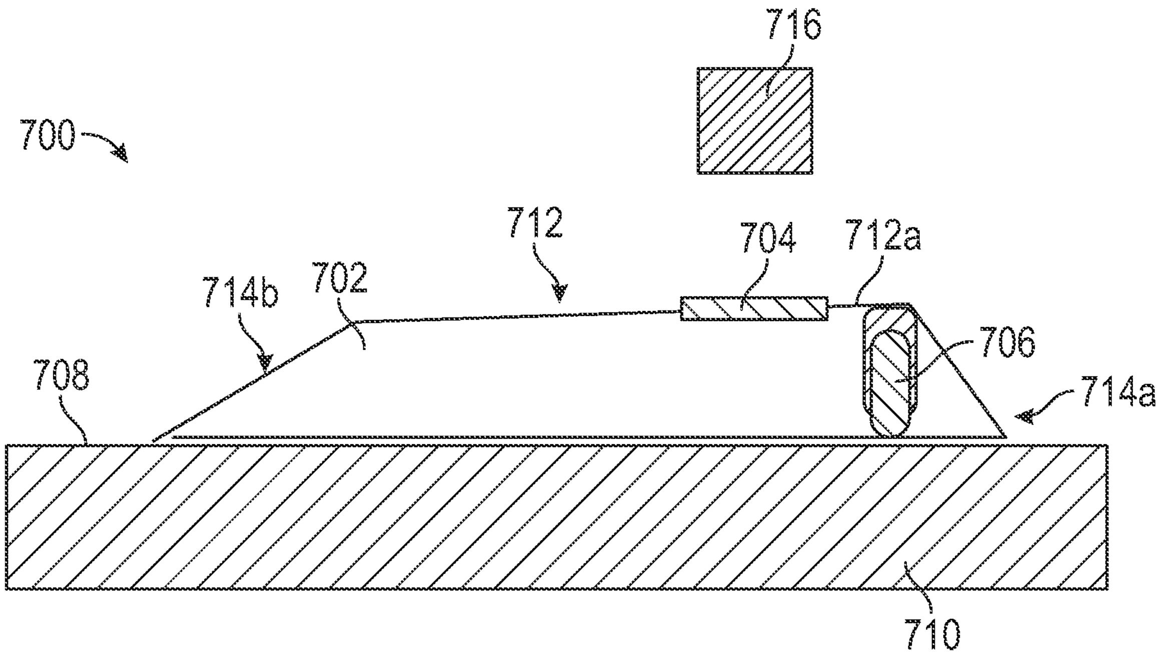
FIGS. 14A and 14B schematically show a further embodiment of a charging station.
Figure 14B:
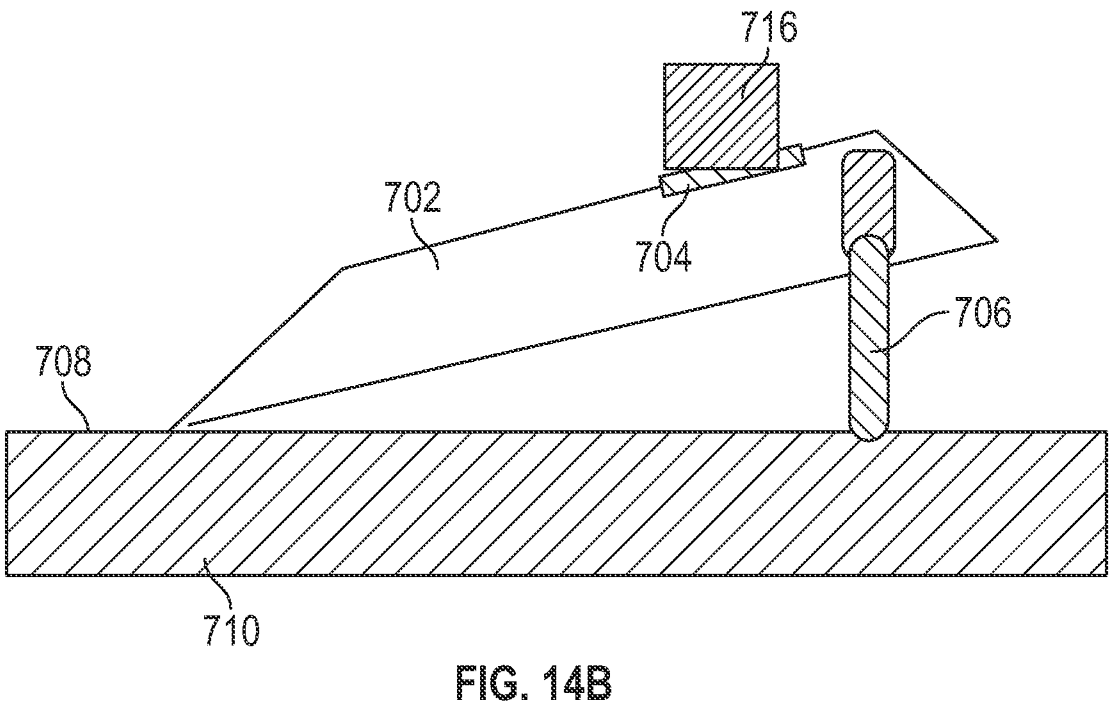
Figure 15A:
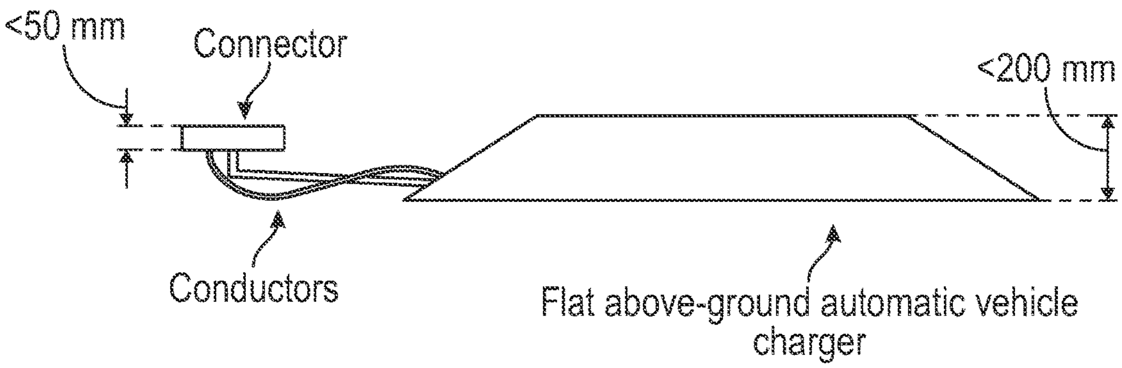
FIGS. 15A through 15D illustrate the engineering problems faces by conventional charging connectors.
Figure 15B:
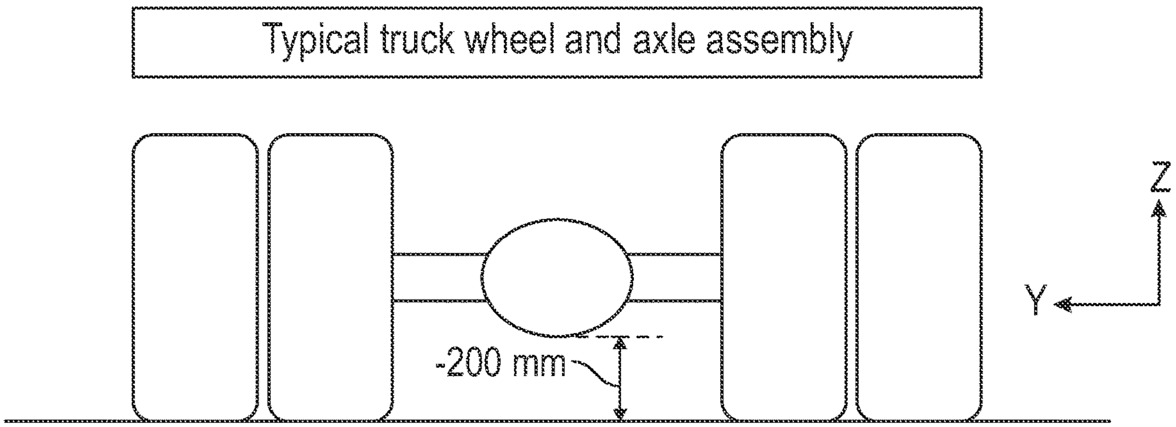
Figure 15C:
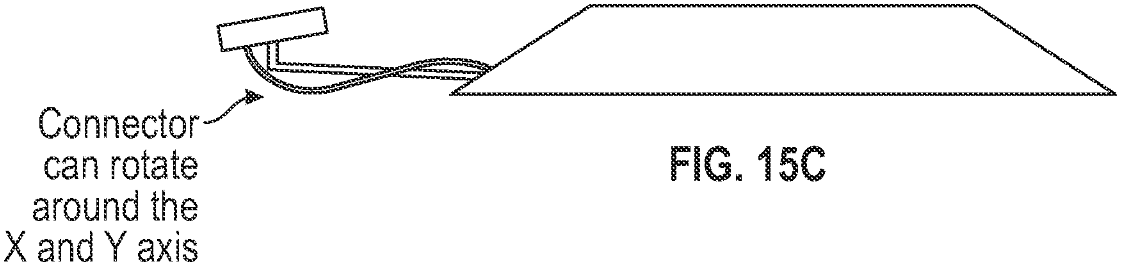
Figure 15D:
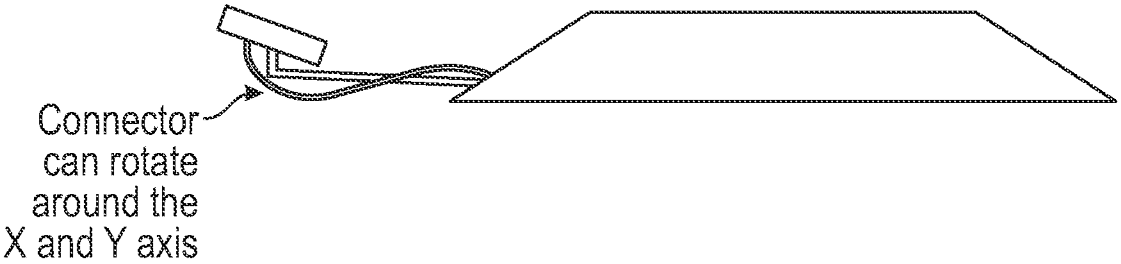

FIGS. 14A and 14B schematically show a further embodiment of a charging station 700 including a housing 702, an electrical connector 704 and an actuator 706. Charging station 700 is fixed directly on top of an upper surface 708 of the ground 710 that is parallel and contiguous with driving surfaces of the 710. Electrical connector 704 is mounted on an upper surface 712*a* of a top wall 712 of housing 702. Top wall 712 is positioned atop a plurality of side walls having bottom edges that contact upper surface 708 of ground 710. The side walls include a front side wall 714*a* and a rear side wall 714*b*. For charging a battery of an electrical vehicle, housing 702 is pivoted upward to move electrical connector 702 into contact with a charging receptacle 716 mounted on the bottom of the vehicle. Actuator 706, which can be for example a hydraulic, pneumatic or spindle actuator moves a first portion of housing 702 upward so electrical connector 702 is moved into contact with charging receptacle 716 to charge the battery. Housing 702 is pivoted about the bottom edge of the rear sidewall 714*b*, which remains in contact with surface 708 of the ground 710, such that the bottom edge of the front side wall 714*a* is moved off of and away from the ground 710.

FIGS. 15A through 15D illustrate the engineering problems faced by conventional charging connectors.

FIGS. 16A-16F show an electrical connector 800 for electric vehicle charging system that is configured for emitting or receiving electricity from the electric vehicle charging station. Connector 800, unless otherwise described below, is configured in the same manner as connector 510. The electrical connector 800 includes a base 802 and an array of coaxial electrical contacts 804. The coaxial design of contacts 804 allows for an autonomous charger to not have to include orientation management of the connector in the design, and provides a large surface area that is enables high power charging of commercial trucks, including semi-trucks, for example. Base 802 can be a polymer, or a composite of a polymer and other electrically non-conductive materials. The polymer may for example be provide with one or more ceramics coatings. The base has a height, a width and a length, with the height being less than the width and the length. A center axis CA of the electrical connector 800 extends in a direction of the height. Each of the contacts 804 is mounted on the base 802 to be radially elastic with respect to the center axis CA to radially press against a further electrical connector 805 mated therewith. Each of the coaxial electrical contacts 804 includes a plurality of radially elastic tabs 806. The plurality of radially elastic tabs 806 of each of the coaxial electrical contacts 804 are arranged in a circle. In other words, tabs 806 are flexible, bendable and resilient in the radial direction and apply force in the radial direction to contacts inserted therein.

Figures 16A, 16B, 16C:
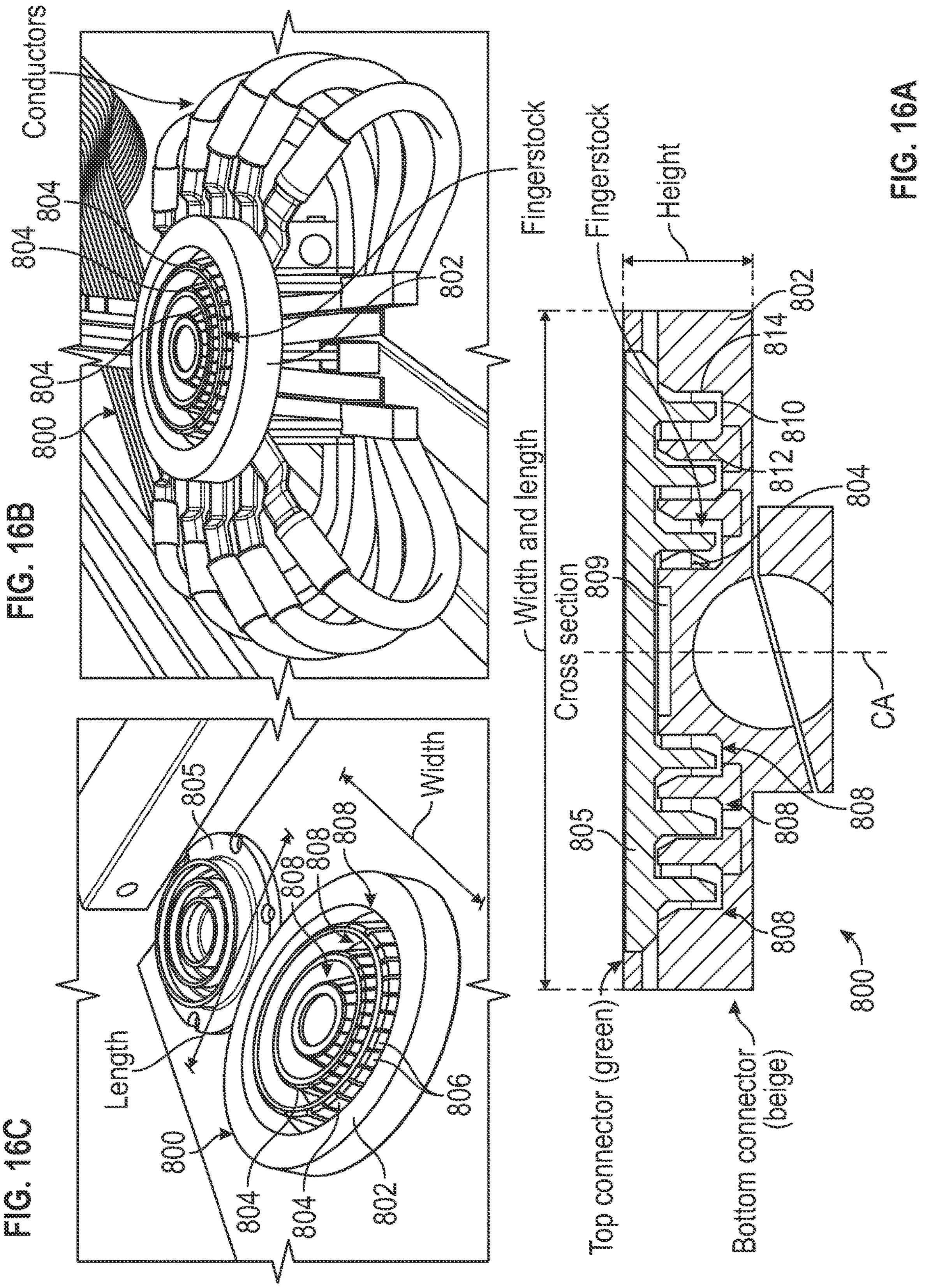
FIGS. 16A through 16F show an electrical connector for electric vehicle charging system that is configured for emitting or receiving electricity from the electric vehicle charging station.
Figure 16D:
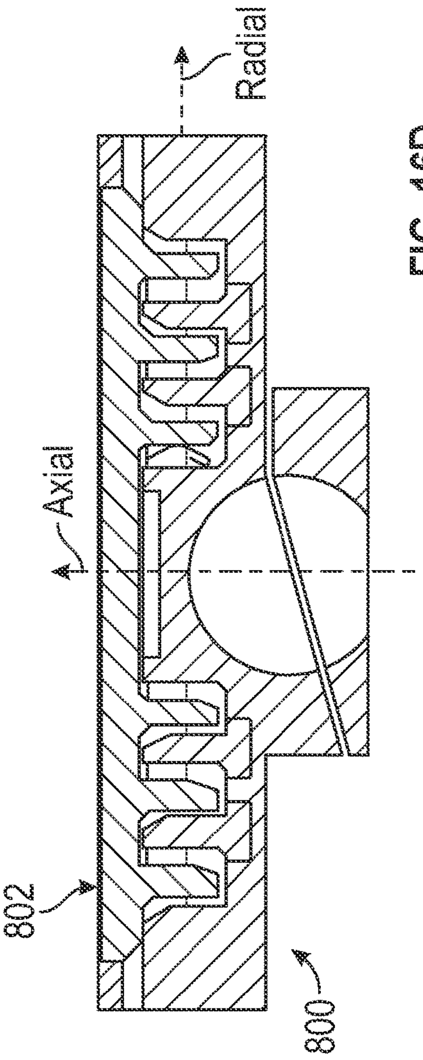
Figure 16E:
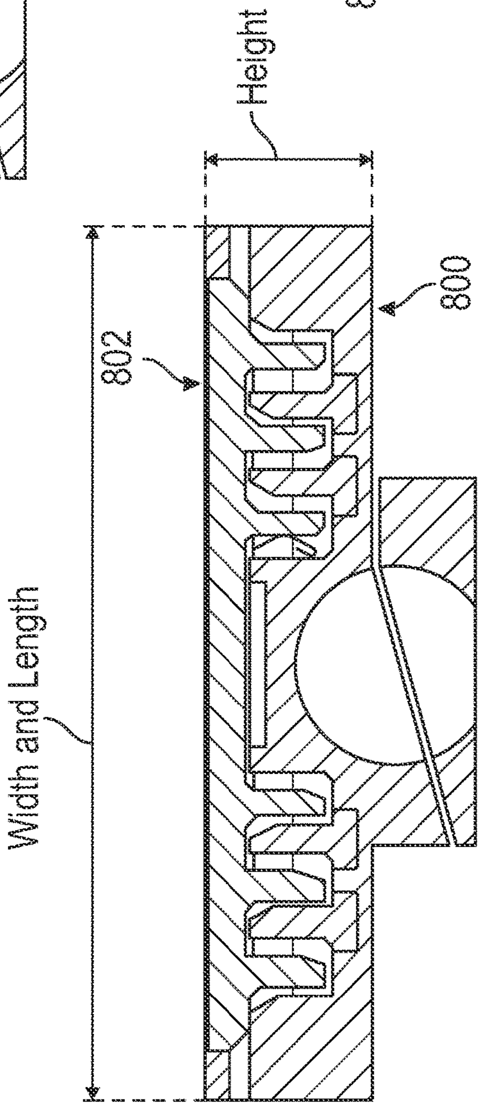
Figure 16F:
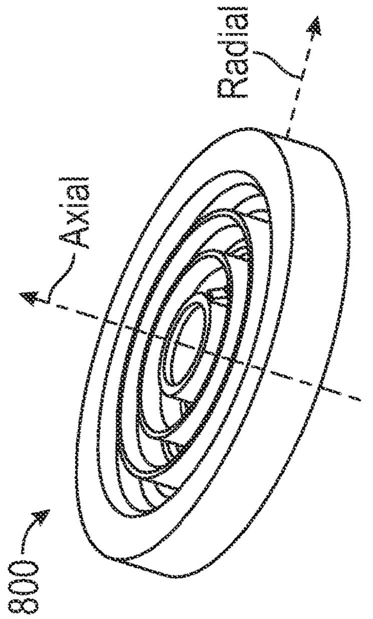
Figures 16G, 16H:
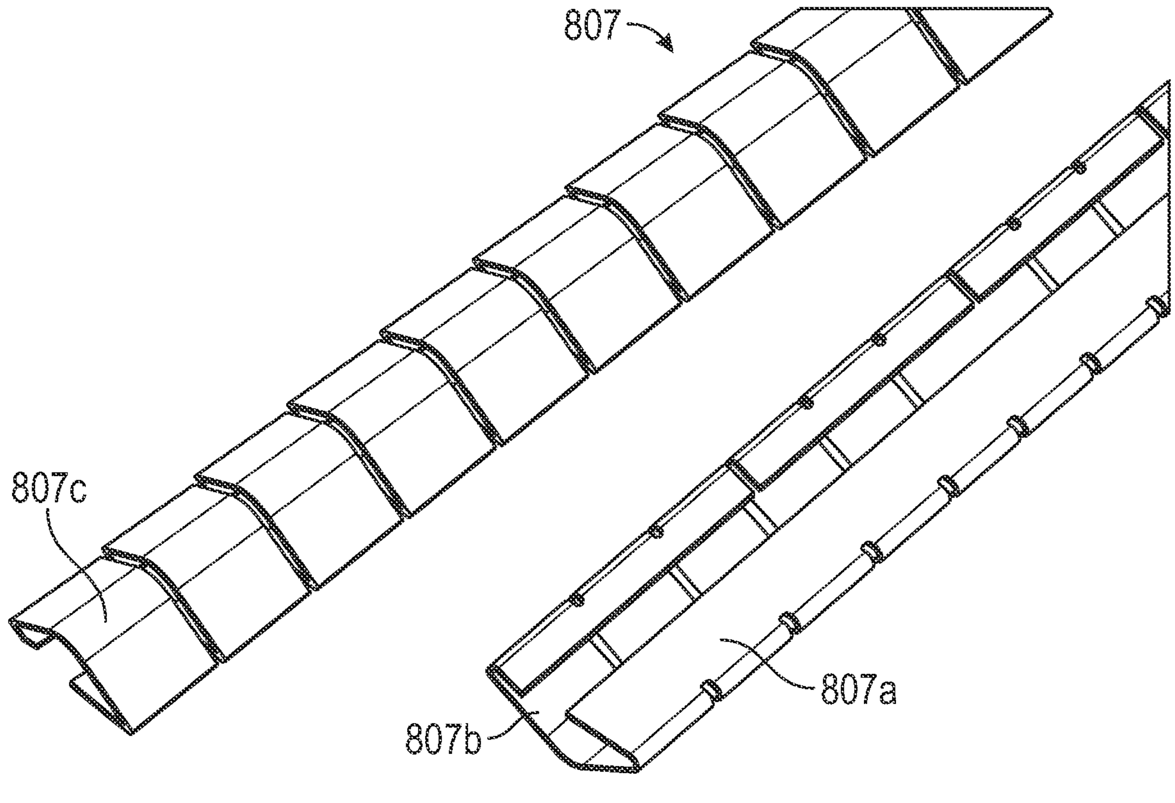
FIGS. 16G and 16H show an example of copper finger stock.

Each of the coaxial electrical contacts 804 can be formed of electrically conductive finger stock. For example, the contacts 84 can be concentric circles of silver-plated copper finger stock that contact radially with concentric rings of solid silver-plated copper. FIGS. 16G-16H shows an example of finger stock 807 prior to application. Finger stock 807 includes a base 807*a* and a plurality of tabs 807*b* extending away from base 807*a*. Each of tabs 807*b* includes a peak 807*c* that is furthest away from the surface to which base 807*a* is attached. Peak 807*c* defines a contact surface configured for contacting the surface of the electrical contact of the mating electrical connector.

Electrical connector 800 can also include a data contact 809 in the form of a single inner spring finger that contacts a target to transmit data. The data contact 809 is on the base 802 radially inside of the coaxial electrical contacts 804. The data contact 809 is concentric with the coaxial electrical contacts 804 and is on the base 802 at the center of the coaxial electrical contacts 804.

The base 802 includes a plurality of coaxial annular grooves 808 and each of the coaxial electrical contacts 804 is in one of the grooves 808. Each of the plurality of coaxial annular grooves 808 includes a radially extending disc-shaped surface 810 and two axially extending cylindrical surfaces 812, 814 extending away from the radially extending disc-shaped surface 810. Each of the coaxial electrical contacts 804 is on axially extending cylindrical surface 812, which define an inner circumferential surface of the respective annular groove 808. In other embodiments, each of the coaxial electrical contacts 804 is on axially extending cylindrical surface 814, which define an outer circumferential surface of the respective annular groove 808. Each of the first electrical contacts 804 includes a portion in the form of tabs 806 that extends radially away from the respective axially extending surface.

In some examples, connector 800 provides for example 500 A and at 1000 VDC to output 500 KW to charge heavy duty vehicles, including for example commercial semi-trucks, quickly. In other examples, the current can be up to 1000 A. In order to transmit currents approaching for example 1000A, contact resistance is minimized and heat is dissipated. The large surface are and high contact force provided by connector 800 decreases the contact resistance. The two outer rings of contacts 804, as noted above with respect to connector 510, can be the negative and positive contacts to promote heat dissipation, with the inner ring being the ground contact.

Figure 17:
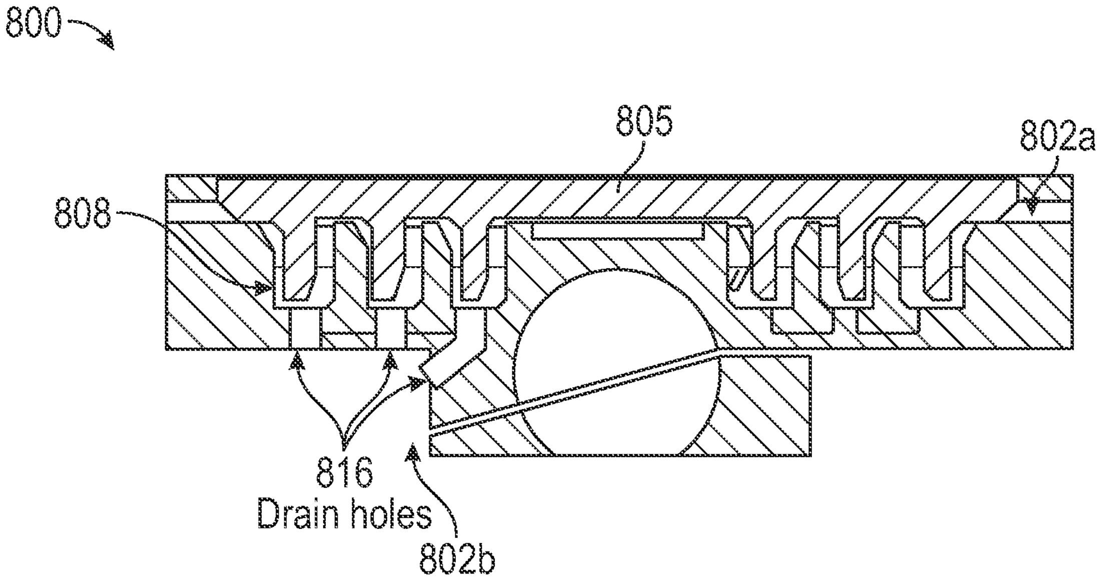
FIG. 17 shows a base of the electrical connector can include a plurality of drain holes.
Figures 19A, 19B, 19C, 19D:
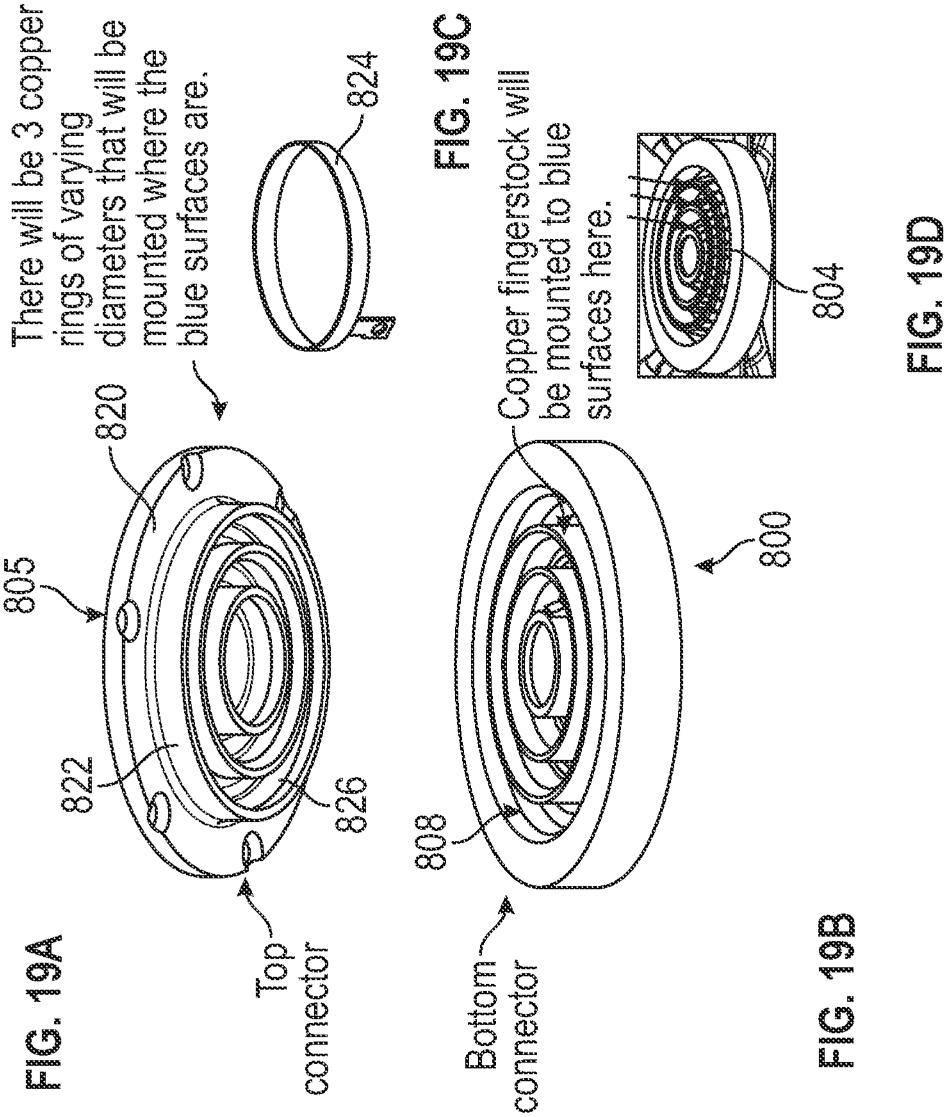
FIGS. 19A through 19D show the second electrical connector can include a second base including a plurality of coaxial rings.

As shown in FIG. 17, base 802 can include a plurality of drain holes 816. The coaxial electrical contacts 804 are on a first axially facing side 802*a* of the base 802 and the drain holes 816 each extend from one of the coaxial annular grooves 808 to a second axially facing side 802*b* of the base 802 opposite the first axially facing side 802*a*. Drain holes 816 allow water to exit low points of the connector 800 via gravity.

As shown in FIGS. 18A and 18B, electrical connector 800 further includes a plurality of terminations 818 on the second axially facing side of the base 802*b*. The terminations 818 are each electrically connected to one of the coaxial electrical contacts 804 and configured for connecting to a respective electrical cable. Terminations 818 allow for large cable to terminate on the high power contacts 804, while allowing for the connector to move freely within the defined envelope that is needed for automatic connection.

As shown in FIGS. 19A-19D, the second electrical connector 805 includes a second base 820 including a plurality of coaxial rings 822. Each of the coaxial rings 822 includes a second electrical contact 824 on an axially extending surface 826 thereof. Each of the coaxial rings 822 is received in a respective one of the coaxial annular grooves 808 such that the first electrical contacts 804 radially press against one of the second electrical contacts 824 when the first electrical connector 800 is mated with the second electrical connector 805.

Figure 20A:
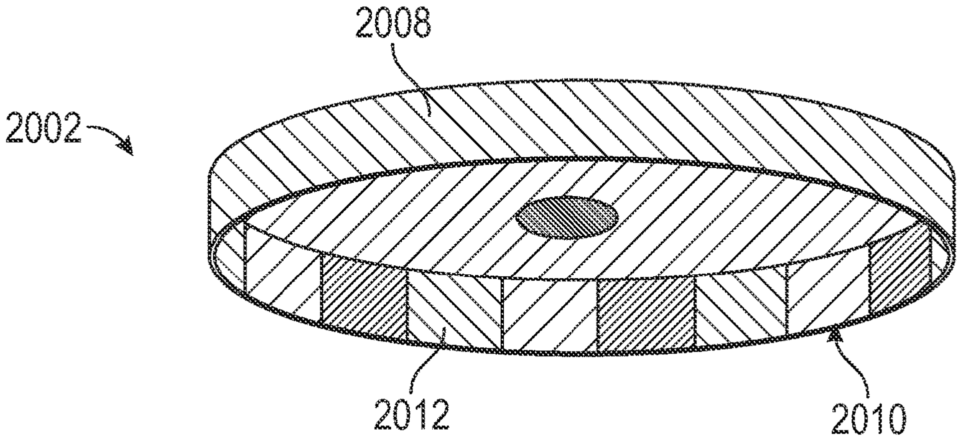
FIGS. 20A and 20B schematically show an exemplary connector configured for mating with each other to charge an electric vehicle battery.
Figure 20B:
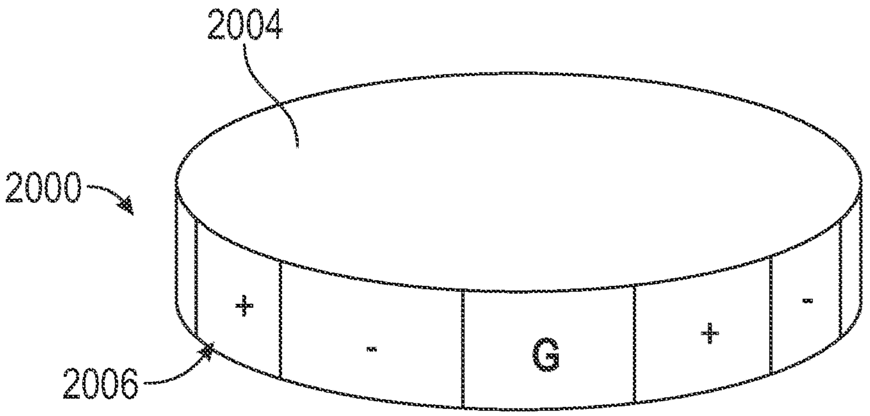

FIGS. 20A and 20B schematically show other exemplary connectors 2000, 2002 configured for mating with each other to charge an electric vehicle battery. One of connectors 2000, 2002 can be mounted on the vehicle, and the other can be part of a charging station, for example fixed to the end of a charging arm. First electrical connector 2000 is configured for emitting or receiving electricity from an electric vehicle charging station and includes a disc shaped base 2004 including an outer circumferential surface and an array of second electrical contacts 2006 formed as circumferentially spaced segments on the outer circumferential surface. Second electrical connector 2002 is configured for emitting or receiving electricity from an electric vehicle charging station, and includes a disc shaped base 2008 having a circular opening 2010 and including an inner circumferential surface within the opening 2010. The second electrical connector 2002 further includes an array of first electrical contacts 2012 formed as circumferentially spaced segments on the inner circumferential surface. The first electrical contacts 2006 contact the second electrical contacts 2012 when the first electrical connector 2000 is received inside of the second electrical connector 2002.

FIGS. 21A and 21B schematically show other exemplary connectors 2100, 2102 configured for mating with each other to charge an electric vehicle battery. One of connectors 2100, 2102 can be mounted on the vehicle, and the other can be part of a charging station, for example fixed to the end of a charging arm. First electrical connector 2100 is configured for emitting or receiving electricity from an electric vehicle charging station and includes a first base 2104 having an outer circumferential surface defined by a plurality of first concentric circles 2106 that are each shifted axially away from each other. First electrical connector 2100 includes a plurality of first electrical contacts 2108 each on one of the concentric circles 2106. Second electrical connector 2102 is configured for emitting or receiving electricity from an electric vehicle charging station and includes a second base 2110 having an inner circumferential surface, which forms a receptacle, defined by a plurality of second concentric circles 2112 that are each shifted axially away from each other. Second electrical connector 2102 further includes a plurality of second electrical contacts 2114 on the inner circumferential surface on each of the circles 2112. The first electrical contacts 2108 contact the second electrical contacts 2014 when the first electrical connector 2100 is received inside of the receptacle of second electrical connector 2102.

Each of the second electric contacts 2114 is mounted on the second base 2110 to be radially elastic with respect to a center axis CA of the second base 2110 to radially press against the first electrical contacts 2108 when the first electrical connector 2100 is received inside of the second electrical connector 2102. In another example, each of the first electric contacts 2108 is mounted on the first base to be radially elastic with respect to a center axis CA of the first base 2104 to radially press against the second electrical contacts 2114 when the first electrical connector 2100 is received inside of the second electrical connector 2102.

Figure 22A:
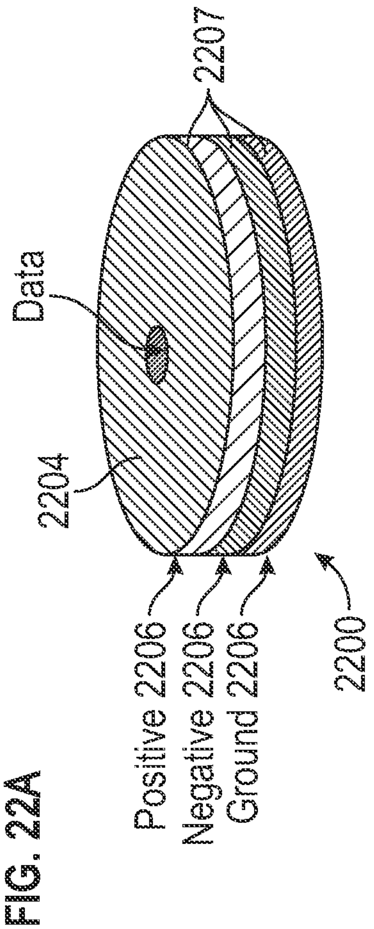
FIGS. 22A and 22B schematically show an exemplary connector configured for mating with each other to charge an electric vehicle battery.
Figure 22B:
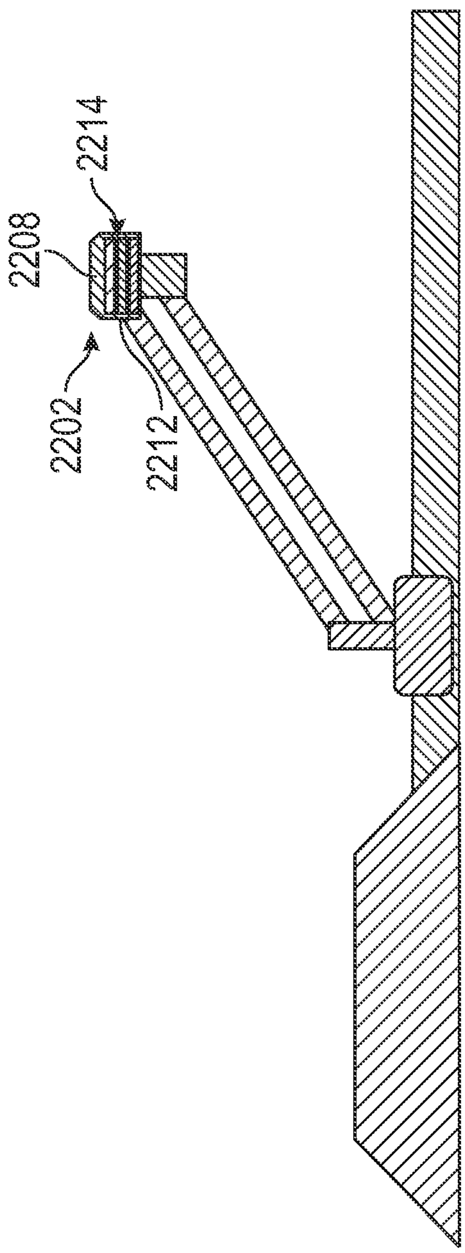

FIGS. 22A and 22B schematically show other exemplary connectors 2200, 2202 configured for mating with each other to charge an electric vehicle battery. One of connectors 2200, 2202 can be mounted on the vehicle, and the other can be part of a charging station, for example fixed to the end of a charging arm. First electrical connector 2200 is configured for emitting or receiving electricity from an electric vehicle charging station and includes a disc shaped base 2204 including an outer circumferential surface and an array of first electrical contacts 2206 formed as axially shifted rings 2207 on the outer circumferential surface. Second electrical connector 2202 is configured for emitting or receiving electricity from an electric vehicle charging station, and includes a disc shaped base 2208 having a circular opening and including an inner circumferential surface within the opening. The second electrical connector 2202 further includes an array of second electrical contacts 2212 formed as formed as axially shifted rings 2214 on the inner circumferential surface. The first electrical contacts 2206 contact the second electrical contacts 2212 when the first electrical connector 2200 is received inside of the second electrical connector 2202.

Figure 23B:
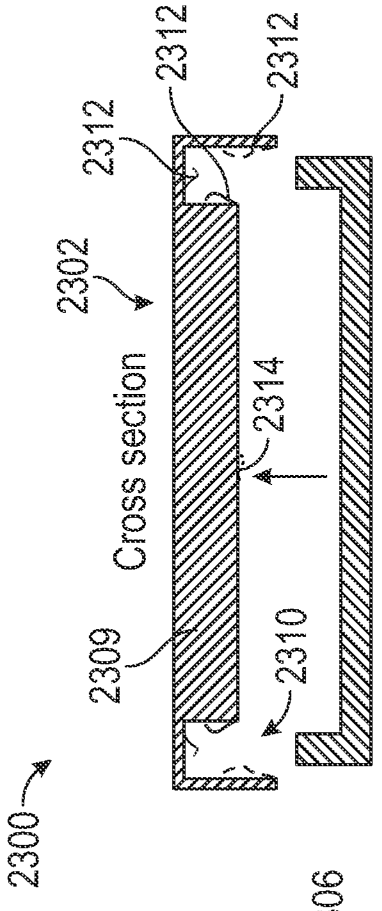
FIGS. 23A and 23B schematically show an exemplary connector configured for mating with each other to charge an electric vehicle battery.
Figure 23A:
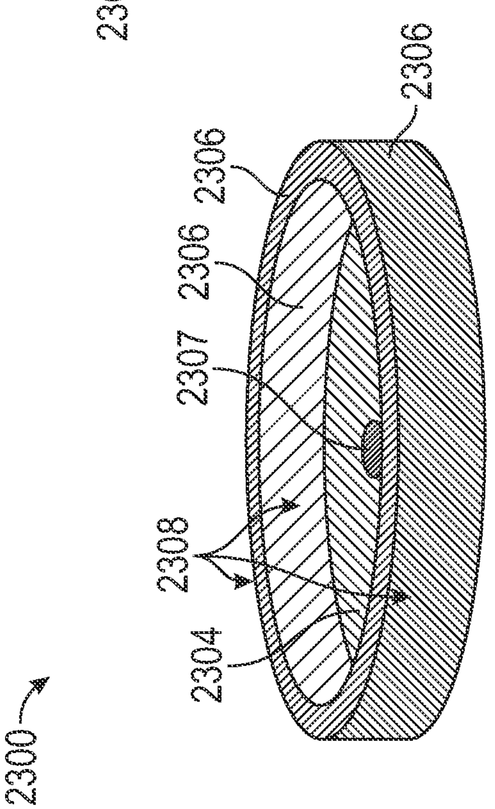

FIGS. 23A and 23B schematically show other exemplary connectors 2300, 2302 configured for mating with each other to charge an electric vehicle battery. One of connectors 2300, 2302 can be mounted on the vehicle, and the other can be part of a charging station, for example fixed to the end of a charging arm. First electrical connector 2300 is configured for emitting or receiving electricity from an electric vehicle charging station and includes a first base 2304 having an annular rim 2306 and an array of first electrical contacts 2308 on an inner circumferential surface of the rim 2306, an outer circumferential surface of the rim 2306 and an axially facing radially extending edge of the rim 2306. Connector 2300 includes a data contact 2307 at the center of contacts 2308. Second electrical connector 2302 is configured for emitting or receiving electricity from an electric vehicle charging station, and includes a disc shaped base 2309 having a circular opening and including an annular groove 2310 formed therein in the opening. The second electrical connector 2302 further includes an array of second electrical contacts 2312 on an inner circumferential surface of the annular groove 2310, an outer circumferential surface of the annular groove 2310 and an axially facing radially extending surface of the annular groove 2310. Connector 2302 includes a data contact 2314 at the center of contacts 2308. The first electrical contacts 2308 contact the second electrical contacts 2312 and data contacts 2307, 2313 contact each other when the first electrical connector 2300 is received inside of the second electrical connector 2302.

Figure 24B:
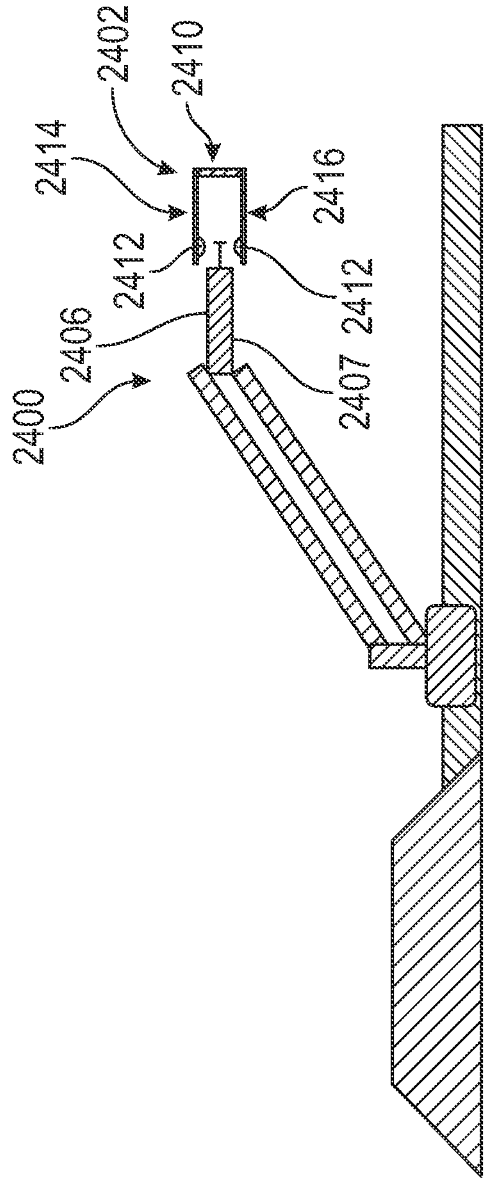
FIGS. 24A and 24B schematically show an exemplary connector configured for mating with each other to charge an electric vehicle battery.
Figure 24A:
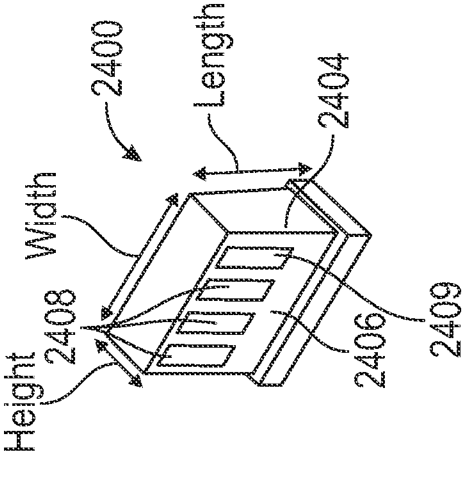

FIGS. 24A and 24B schematically show other exemplary connectors 2400, 2402 configured for mating with each other to charge an electric vehicle battery. One of connectors 2400, 2402 can be mounted on the vehicle, and the other can be part of a charging station, for example fixed to the end of a charging arm. In FIG. 24B, connector 2400 is mounted on a charging arm and connector 2400 is mounted on the vehicle. First electrical connector 2400 is configured for emitting or receiving electricity from an electric vehicle charging station and includes a first base 2404 having a height, a width and a length, with the height being less than the width and the length. Based 2404 includes a surface 2406 and an array of first electrical contacts 2408 on the surface 2406, which can be the top surface. The bottom surface 2407 can configured in the same manner as surface 2406 and can include contacts 2408 in the same orientation. First electrical contacts 2408 are formed by a plurality of strips running parallel to each other. Connector 2400 includes a data contact 2409 with the same design as contacts 2409. Second electrical connector 2402 is configured for emitting or receiving electricity from an electric vehicle charging station, and is configured as a receiver for horizontally receiving the first electrical connector 2402. The second electrical connector 2402 includes a base 2410 an array of second electrical contacts 2412 (and a data contact) inside of base 2410. Base 2410 includes an upper wall 2414 and a lower wall 2416 defining a horizontally facing opening. Each of walls 2414, 2416 can include a respective positive, negative, ground and data contact. The first electrical contacts 2408 contact the second electrical contacts 2412 and the data contacts contact each other when the first electrical connector 2400 is received inside of the second electrical connector 2402.

A method of charging an electric vehicle using connectors 2400, 2402 can include and moving the charging arm via the actuator to horizontally insert the electrical connector 2400 into the electrical connector 2402.

Figures 25A, 25B:
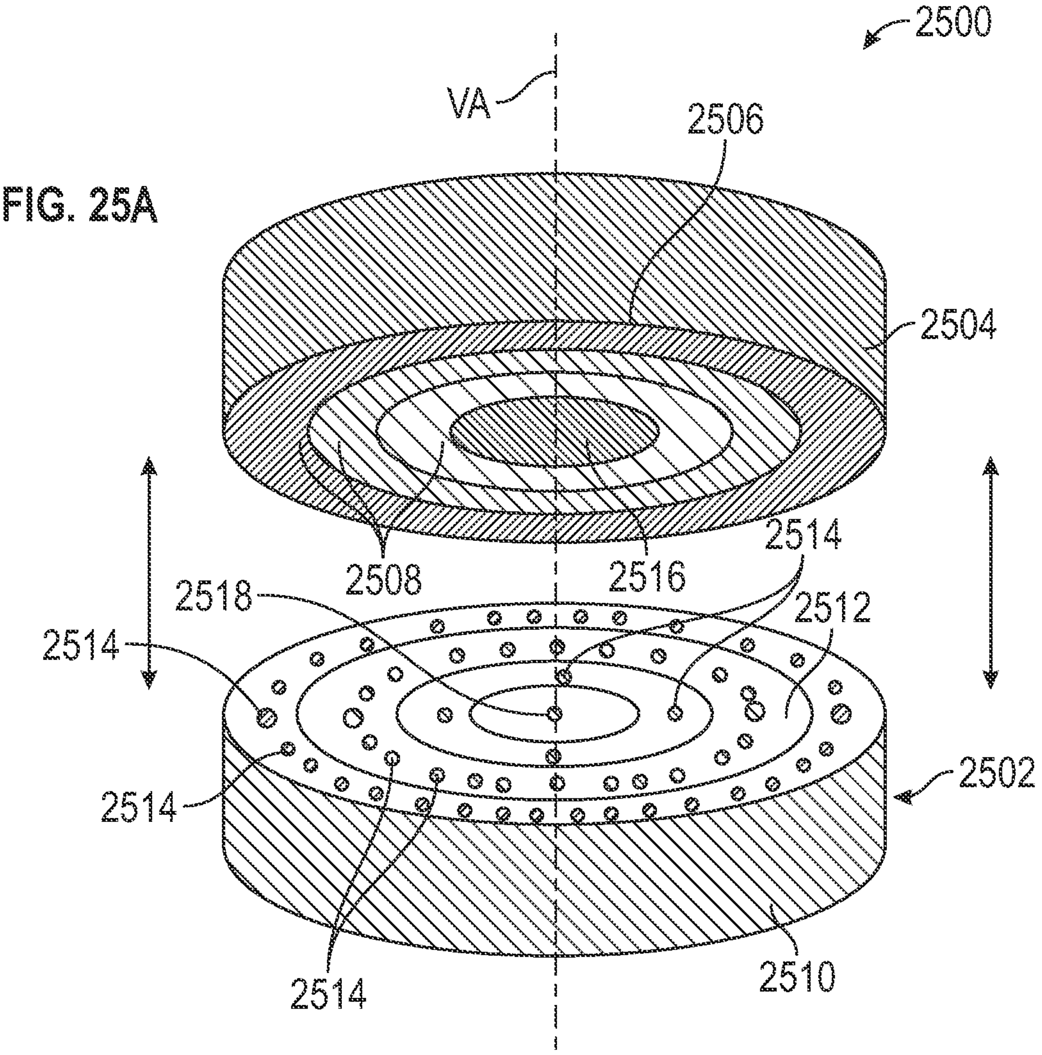
FIGS. 25A and 25B schematically show an exemplary connector configured for mating with each other to charge an electric vehicle battery.

FIGS. 25A and 25B schematically show other exemplary connectors 2500, 2502 configured for mating with each other to charge an electric vehicle battery. One of connectors 2500, 2502 can be mounted on the vehicle, and the other can be part of a charging station, for example fixed to the end of a charging arm. First electrical connector 2500 is configured for emitting or receiving electricity from an electric vehicle charging station and includes a disc shaped first base 2504 including a first surface 2506 and first ring-shaped electrical contacts 2508 on the surface 2506. The first base 2504 has a height, a width and a length, with the height being less than the width and the length, a vertical axis VA of the electrical connector extending in a direction of the height and passing through the surface 2506. Second electrical connector 2502 is configured for emitting or receiving electricity from an electric vehicle charging station and includes a disc shaped second base 2510 including a second surface 2512 and electrical contacts 2514 arranged in rings on the surface 2512. The second base 2510 has a height, a width and a length, with the height being less than the width and the length, vertical axis VA of the electrical connector extending in a direction of the height and passing through the surface 2512. Connectors 2500, 2502 also include data contacts 2516, 2518 at their respective centers. The first electrical contacts 2508 contact the second electrical contacts 2514 and data contacts 2526, 2518 contact each other when the first electrical connector 2500 is received inside of the second electrical connector 2502.

Figure 26:
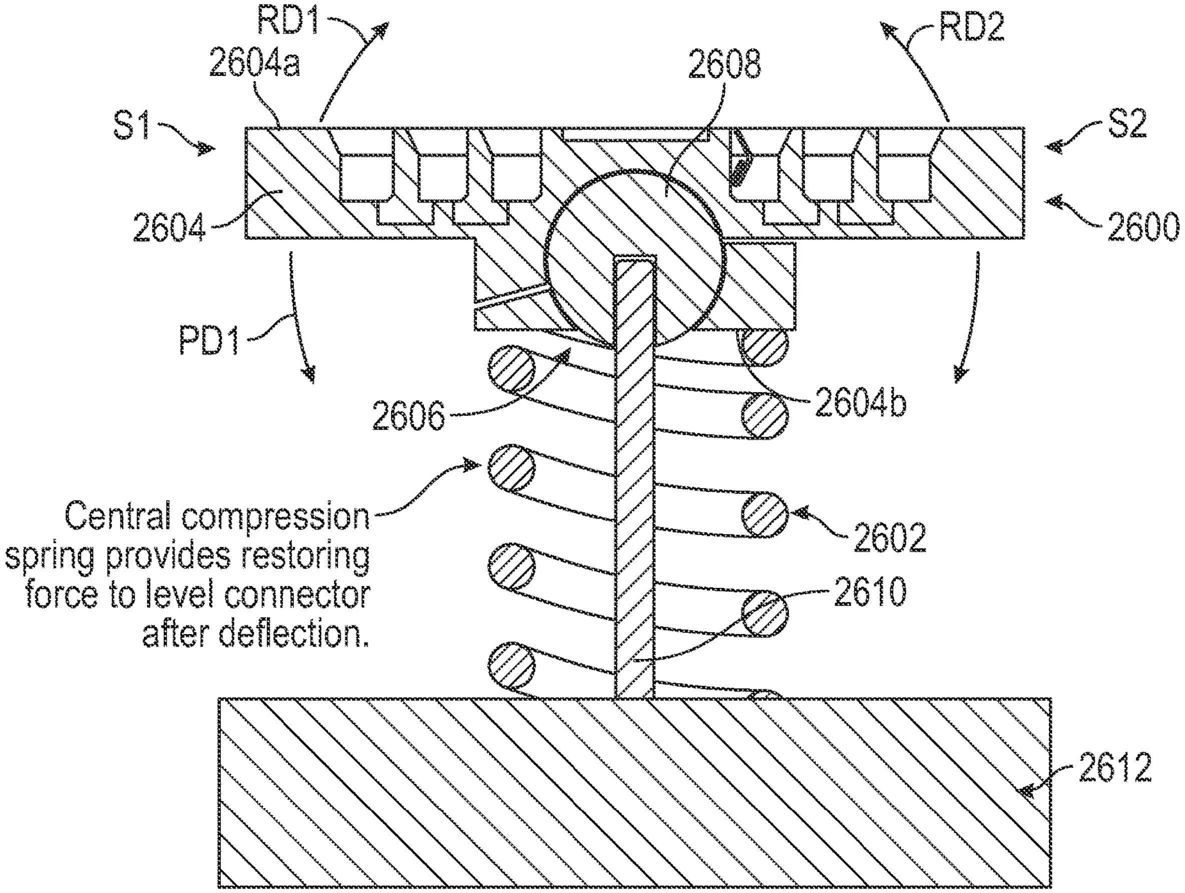
FIGS. 26 to 29 show examples of an electrical connector including different elastic members for providing a restorative force to the electrical connector after the electrical connector is deflected.

FIG. 26 shows an example of an electrical connector 2600 including a spring 2602 for providing a restorative force to electrical connector 2600 after connector 2600 is deflected. As similar shown in FIG. 12, base 2604 of connector 2600 is angularly movably mounted on a ball joint 2606, which includes a ball 2608 received within base 2604 and a shaft 2610 extending downward from ball 2608 to connect with a support section 2612 of the charging arm. Base 2604 is rotatably mounted on ball 2608 such that base 2604 is angularly pivotable in three dimensions with respect to shaft 2610 and support section 2612. One side of base 2604 can move downward upon the upper surface 2604*a* of base 2604 contacting a surface of the electrical connector with which connector 2600 mates, causing spring 2602 to partially compress. Following such contact and deflection, spring 2602 provides a restorative force by expanding to its steady state extended positon, which is shown in FIG. 26. For example, if a first side S1 of base is deflected downward along a curved deflection path PD1, spring 2602 acts on a lower surface 2604*b* of base 2604 to force base 2604 in a restorative direction RD1 such that base 2604 returns to its non-deflected steady state orientation shown in FIG. 26. Similarly, if a second side S2 of base is deflected downward along a curved deflection path PD2, spring 2602 acts on lower surface 2604*b* of base 2604 to force base 2604 in a restorative direction RD2 such that base 2604 returns to its non-deflected steady state orientation. In FIG. 26, spring 2602 is a coil compression spring that surrounds shaft 2610 such that shaft 2610 is provided at the center axis of spring 2602. A top end of spring 2602 contacts lower surface 2604*b* of base 2604 and a bottom end of spring 2602 contacts support section 2612.

Figure 27:
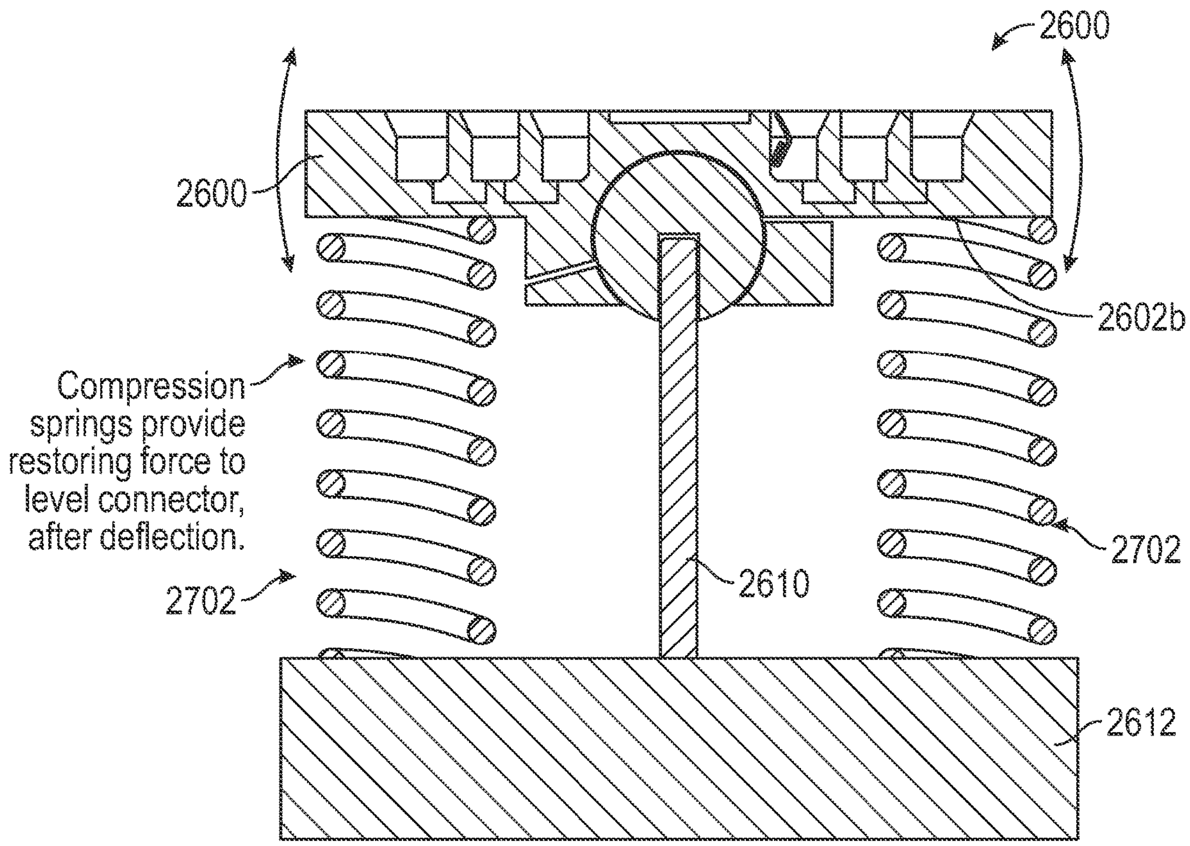

FIG. 27 shows an example in which a plurality of springs 2702 provide a restorative force to electrical connector 2600 after connector 2600 is deflected. Springs 2702 are coil compression springs that each contact and are fixed to lower surface 2602*b* of base 2602 and each contact and are fixed to support section 2612. Springs 2702 are spaced radially away from shaft 2610.

Figure 28:
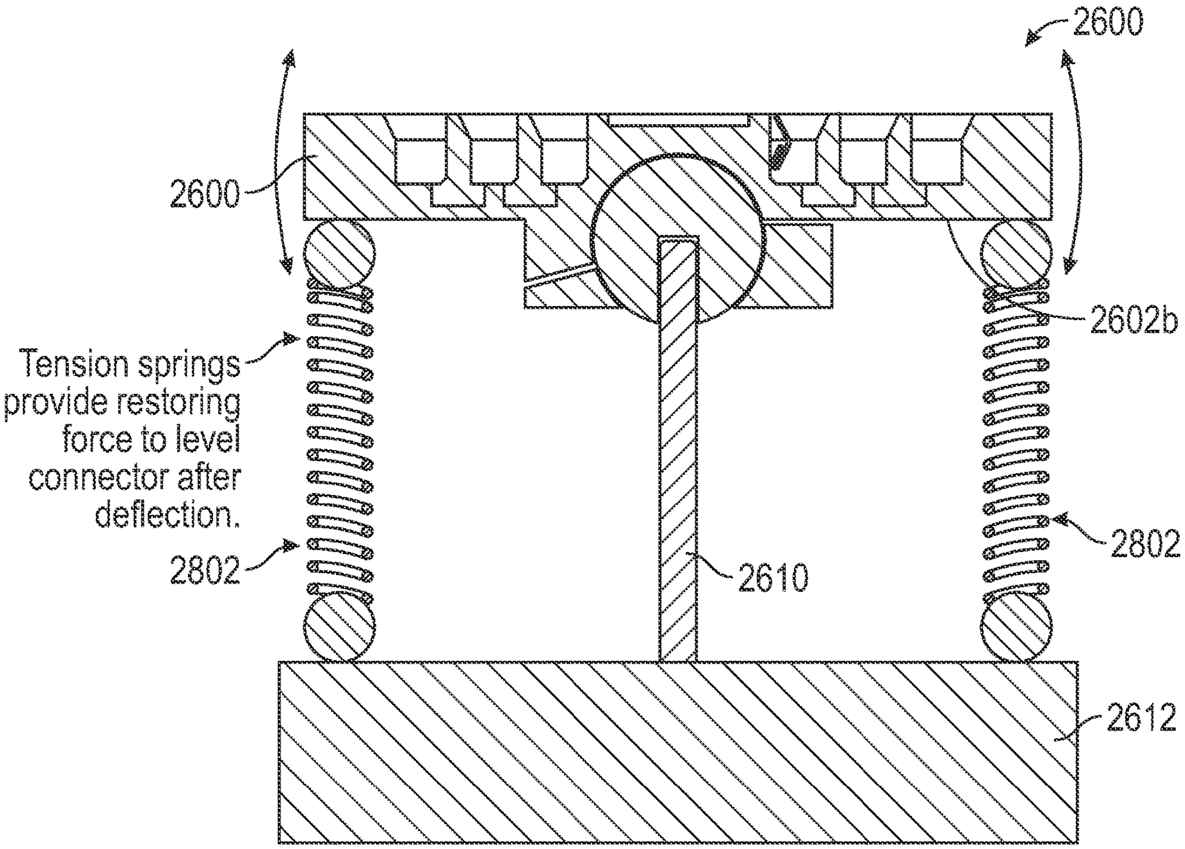

FIG. 28 shows an example in which a plurality of springs 2802 provide a restorative force to electrical connector 2600 after connector 2600 is deflected. Springs 2802 are coil tension springs that each contact and are fixed to lower surface 2602*b* of base 2602 and each contact and are fixed to support section 2612. Springs 2802 are spaced radially away from shaft 2610.

Figure 29:
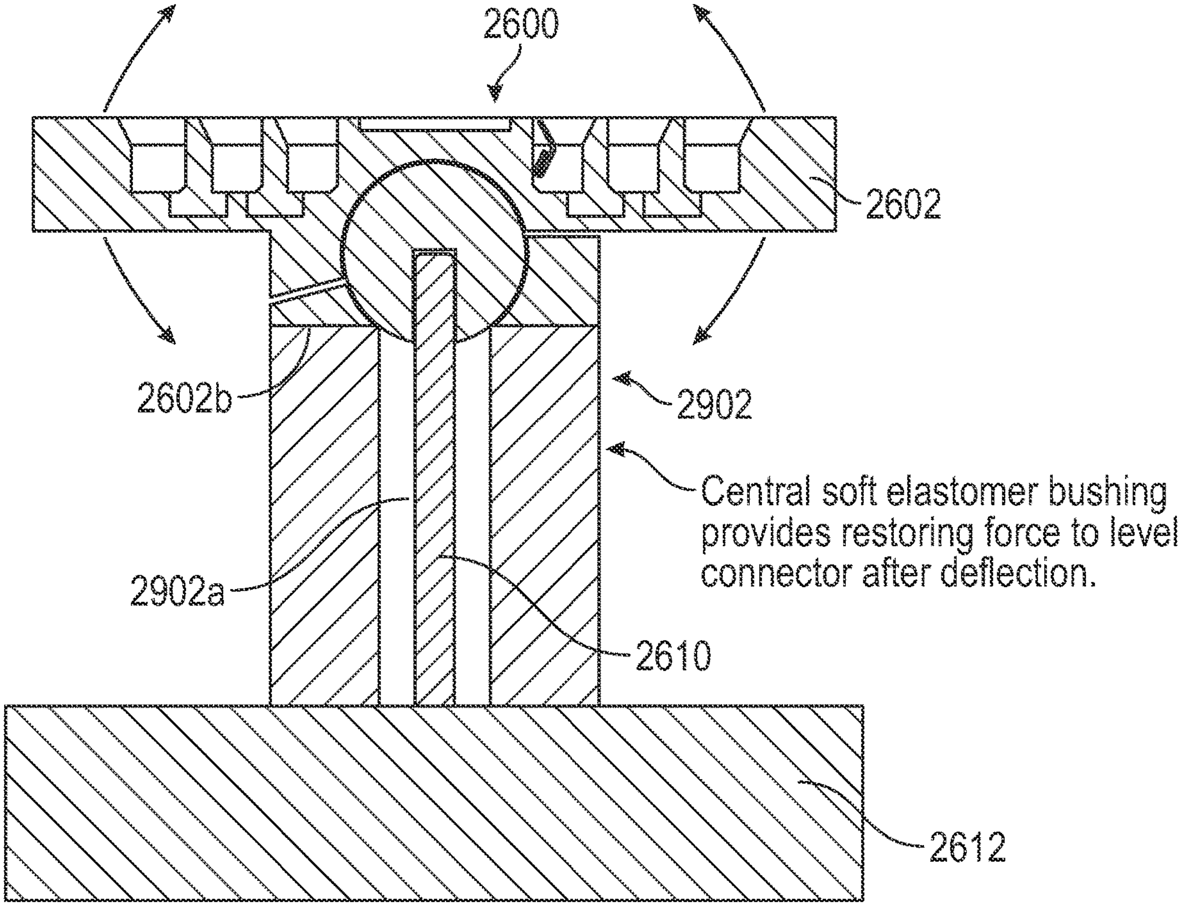

FIG. 29 shows an example in which an elastomer bushing 2902 provides a restorative force to electrical connector 2600 after connector 2600 is deflected. Bushing 2902 is a hollow cylinder formed of a compressive elastomer. Bushing 2902 surrounds shaft 2610 such that shaft 2610 is provided at the center axis of spring 2602 inside of the hole 2902*a* passing through bushing 2902. A top end of bushing 2902 contacts lower surface 2604*b* of base 2604 and a bottom end of bushing 2902 contacts support section 2612.

FIGS. 30A and 30B show an example of the base 2602 of the electrical connector 2600 including a plurality of terminations 3000 on the lower surface 2602*b* of the base 2602*b*. The terminations 3000 are each electrically connected to one of the coaxial electrical contacts 804 shown in FIGS. 16A and 16F and are configured for connecting to a respective electrical cable. Terminations 3000 are radially oriented and are clumped together on one side of lower surface 2602*b* to allow for large cable to join all of the terminations 3000 on one side of the ball joint.

Figures 31A, 31B, 31C:
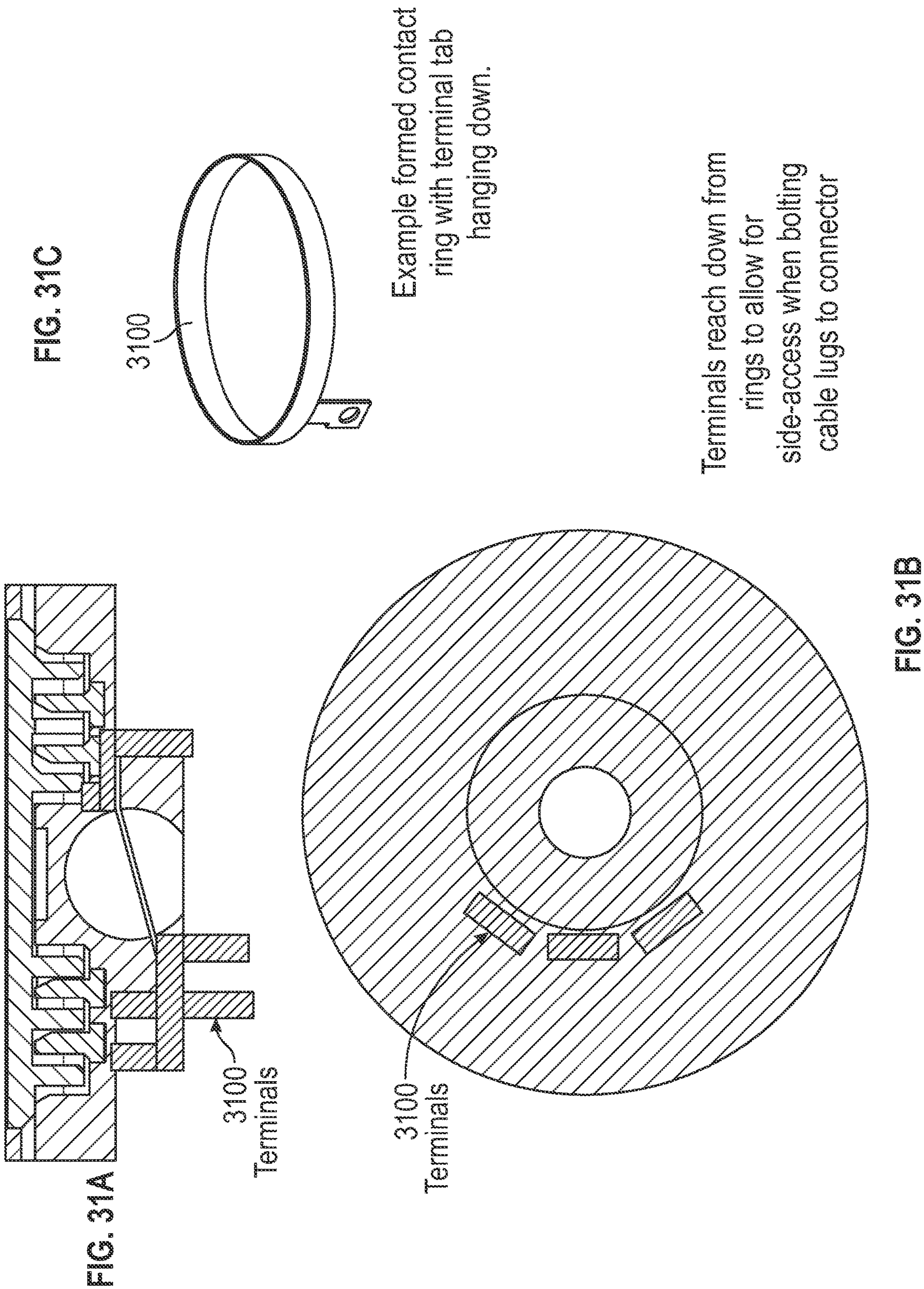
FIGS. 31A, 31B, and 31C show a further example of the base of the electrical connector including a plurality of terminations on the second axially facing side of the base.

FIGS. 31A through 31C shows terminations 3100 that are axially oriented, to allow for side-access when bolting cable lugs to the electrical connector, and are clumped together on one side of lower surface 2602*b* to allow for large cable to join all of the terminations 3100 on one side of the ball joint. Terminations 3100 can be integrally formed with the electrical contacts 3102 of the electrical connector.

In the preceding specification, the invention has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

What is claimed is:

1. An electric vehicle charging system comprising:

an electrical connector configured for emitting or receiving electricity, the electrical connector including a base and an array of coaxial electrical contacts, the base having a height, a width and a length, the height being less than the width and the length, a center axis of the electrical connector extending in a direction of the height, each of the coaxial electrical contacts being mounted on the base to be individually radially elastic with respect to the center axis to radially press against a further electrical connector mated therewith, wherein the electrical connector includes a data contact on the base radially inside of the coaxial electrical contacts.

2. The electric vehicle charging system as recited in claim 1 wherein each of the coaxial electrical contacts includes a plurality of radially elastic tabs.

3. The electric vehicle charging system as recited in claim 2 wherein the plurality of radially elastic tabs of each of the coaxial electrical contacts are arranged in a circle.

4. The electric vehicle charging system as recited in claim 1 wherein each of the coaxial electrical contacts is formed of electrically conductive finger stock.

5. The electric vehicle charging system as recited in claim 1 wherein the base includes a plurality of coaxial annular grooves, each of the coaxial electrical contacts being in one of the grooves.

6. The electric vehicle charging system as recited in claim 5 wherein each of the plurality of coaxial annular grooves includes a radially extending disc-shaped surface and two axially extending cylindrical surfaces extending away from the radially extending disc-shaped surface, each of the coaxial electrical contacts being on one of the axially extending cylindrical surfaces.

7. The electric vehicle charging system as recited in claim 6 wherein each of the coaxial electrical contacts is on the axially extending cylindrical surface defining an inner circumferential surface of the respective annular groove.

8. The electric vehicle charging system as recited in claim 6 wherein each of the coaxial electrical contacts is on the axially extending cylindrical surface defining an outer circumferential surface of the respective annular groove.

9. The electric vehicle charging system as recited in claim 5 further comprising a plurality of drain holes, the coaxial electrical contacts being on a first axially facing side of the base, the drain holes each extending from one of the coaxial annular grooves to a second axially facing side of the base opposite the first axially facing side.

10. The electric vehicle charging system as recited in claim 1 wherein the coaxial electrical contacts are on a first axially facing side of the base, the electrical connector further including a plurality of terminations on a second axially facing side of the base opposite the first axially facing side, the terminations each being electrically connected to one of the coaxial electrical contacts and configured for connecting to a respective electrical cable.

11. The electric vehicle charging system as recited in claim 1 wherein the data contact is concentric with the coaxial electrical contacts.

12. The electric vehicle charging system as recited in claim 1 wherein the data contact is on the base at the center of the coaxial electrical contacts.

13. An electric vehicle charging system comprising:

a first electrical connector; and a second electrical connector configured for mating with the first electrical connector for emitting electricity from one of the first or second electrical connector to the other of the first or second electrical connector, the first electrical connector including a first base and an array of first coaxial electrical contacts, the first base having a height, a width and a length, the height being less than the width and the length, a center axis of the first electrical connector extending in a direction of the height, the first base including a plurality of first coaxial annular grooves, each of the first coaxial annular grooves including an axially extending surface, one of the first electrical contacts being in each of the grooves, each of the first electrical contact extending radially away from the respective axially extending surface, wherein the first electrical connector includes a data contact on a base radially inside of the first coaxial electrical contacts .

14. The electric vehicle charging system as recited in claim 13 wherein each of the first electrical contacts is mounted on the base to be radially elastic with respect to the center axis to radially press against second electrical contacts of the second electrical connector when the first electrical connector is mated with the second electrical connector.

15. The electric vehicle charging system as recited in claim 14 wherein the second electrical connector includes a second base including a plurality of coaxial rings, each of the coaxial rings including one of the second electrical contacts on an axially extending surface thereof, each of the coaxial rings being received in a respective one of the coaxial annular grooves such that the first electrical contacts radially press against one of the second electrical contacts when the first electrical connector is mated with the second electrical connector.

16. An electric vehicle charging system comprising:

a first electrical connector configured for emitting or receiving electricity, the first electrical connector including a first base including a surface and first ring-shaped electrical contacts on the surface, the first base having a height, a width and a length, the height being less than the width and the length, a vertical axis of the first electrical connector extending in a direction of the height and passing through the surface, the first electrical contacts being on the surface, wherein the first electrical connector includes a data contact on the base radially inside of the ring-shaped electrical contacts; and a second electrical connector configured for emitting or receiving electricity, the second electrical connector including a second base and an array of second electrical contacts on the second base, the first electrical contacts contacting the second electrical contacts when the first electrical connector is received inside of the second electrical connector.

17. The electric vehicle charging system as recited as recited in claim 16, wherein the first base and the second base are each disc-shaped.

18. An electric vehicle charging system comprising:

a charging arm;

an electrical connector mounted on the charging arm and configured for emitting electricity from the electric vehicle charging station; and an actuator configured for moving the electrical connector into engagement with an electric receptacle on an electric vehicle, the electrical connector including a base including a surface and electrical contacts on the surface, the base having a height, a width and a length, the height being less than the width and the length, a vertical axis of the electrical connector extending in a direction of the height and passing through the surface, wherein the electrical connector includes a data contact on a base radially inside the electrical contacts.

19. The electric vehicle charging system as recited in claim 18 wherein the electrical contacts are formed by a plurality of strips running parallel to each other.

* * * * *